United States Patent
Lin

(10) Patent No.: US 8,972,653 B2
(45) Date of Patent: Mar. 3, 2015

(54) MEMORY MANAGEMENT METHOD, AND MEMORY CONTROLLER AND MEMORY STORAGE APPARATUS USING THE SAME

(71) Applicant: Phison Electronics Corp., Miaoli (TW)

(72) Inventor: Wei Lin, Taipei (TW)

(73) Assignee: Phison Electronics Corp., Miaoli (TW)

( * ) Notice: Subject to any disclaimer, the term of this patent is extended or adjusted under 35 U.S.C. 154(b) by 273 days.

(21) Appl. No.: 13/749,697

(22) Filed: Jan. 25, 2013

(65) Prior Publication Data

US 2014/0156912 A1 Jun. 5, 2014

(30) Foreign Application Priority Data

Dec. 4, 2012 (TW) .............................. 101145497 A

(51) Int. Cl.
*G06F 12/00* (2006.01)
*G06F 12/02* (2006.01)
*G06F 3/06* (2006.01)

(52) U.S. Cl.
CPC .......... *G06F 12/0246* (2013.01); *G06F 3/0619* (2013.01); *G06F 2212/7211* (2013.01)
USPC .......... 711/103; 711/154; 711/165; 714/773; 714/704

(58) Field of Classification Search
None
See application file for complete search history.

(56) References Cited

U.S. PATENT DOCUMENTS

| 2007/0266200 | A1* | 11/2007 | Gorobets et al. | 711/103 |
| 2010/0325340 | A1* | 12/2010 | Feldman et al. | 711/103 |
| 2011/0173378 | A1* | 7/2011 | Filor et al. | 711/103 |
| 2013/0339574 | A1* | 12/2013 | Franceschini et al. | 711/103 |

\* cited by examiner

*Primary Examiner* — Matthew Bradley
*Assistant Examiner* — Alan Otto
(74) *Attorney, Agent, or Firm* — Jianq Chyun IP Office

(57) ABSTRACT

A memory management method and a memory controller and a memory storage apparatus using the same are provided. The method includes applying different detection biases to read data stored in physical pages of a rewritable non-volatile memory module and calculating the number of error bits according the read data. The method further includes estimating a value of a wearing degree of each physical page according to the calculated number of error bits and operating the rewritable non-volatile memory module according to the value of the wearing degree of each physical page. Accordingly, the method can effectively identify the wearing degree of the rewritable non-volatile memory module and operate the rewritable non-volatile memory module by applying a corresponding management mechanism, so as to prevent data errors.

21 Claims, 18 Drawing Sheets

MEMORY MANAGEMENT METHOD, AND MEMORY CONTROLLER AND MEMORY STORAGE APPARATUS USING THE SAME

CROSS-REFERENCE TO RELATED APPLICATION

This application claims the priority benefit of Taiwan application serial no. 101145497, filed on Dec. 4, 2012. The entirety of the above-mentioned patent application is hereby incorporated by reference herein and made a part of this specification.

BACKGROUND

1. Technology Field

The present invention relates to a memory management method for managing a rewritable non-volatile memory module, and a memory controller and a memory storage apparatus using the same.

2. Description of Related Art

Digital cameras, cell phones, and MP3 players have undergone rapid growth in recent years, so that consumers' demands for storage media have also increased drastically. Since a rewritable non-volatile memory has the characteristics of non-volatility of data, low power consumption, small volume, non-mechanical structure, and fast reading and writing speed, the rewritable non-volatile memory is the most adaptable memory to be applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

In a NAND flash memory, memory cells are linked through bit lines and word lines to form a memory cell array. At present, the NAND flash memory may be classified into a multi-level cell (MLC) NAND flash memory and a single-level cell (SLC) NAND flash memory according to the number of bits which may be stored in each memory cell. Each memory cell can store one bit of data in the SLC NAND flash memory, and each memory cell can store at least two bits of data in the MLC NAND flash memory. For instance, in an exemplary 4-level cell NAND flash memory, each memory cell may store 2 bits of data (i.e., "11," "10," "00," or "01").

FIG. 1 is a schematic diagram illustrating a flash memory device according to the related art.

With reference to FIG. 1, a flash memory device 1 includes a charge-trapping layer 2 for storing electrons, a control gate 3 for applying a bias voltage, a tunnel oxide layer 4, and an interpoly dielectric layer 5. When it is intended to write data into the flash memory device 1, a threshold voltage of the flash memory device 1 may be changed by injecting electrons into the charge-trapping layer 2. Accordingly, a digital-level state of the flash memory device 1 is defined to implement a function of storing data. Here, the process of injecting the electrons to the charge-trapping layer 2 is referred to as a programming process. By contrast, when it is intended to remove the stored data, the injected electrons are removed from the charge-trapping layer 2, and thereby the flash memory device 1 is restored back to the default state before programming.

During writing and erasing operations, the flash memory device 1 deteriorates due to the frequent injection and removal of the electrons, thus increasing the speed of writing the electrons and extending the distribution of the threshold voltage. As a result, after the flash memory device 1 is programmed, the storage state of the flash memory device 1 is unlikely to be identified accurately, which results in the occurrence of error bits. How to effectively learn the aging degree of the flash memory device and correspondingly adjust a mechanism of operating the flash memory device is one of the major subjects to which people skilled in the art are dedicated.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a memory management method that can effectively identify the wearing degree of a rewritable non-volatile memory module and correspondingly adjust a mechanism of operating the rewritable non-volatile memory module.

The present invention is also directed to a memory controller that can effectively identify the wearing degree of a rewritable non-volatile memory module and correspondingly adjust a mechanism of operating the rewritable non-volatile memory module.

The present invention is also directed to a memory storage apparatus that can effectively identify the wearing degree of a rewritable non-volatile memory module and correspondingly adjust a mechanism of operating the rewritable non-volatile memory module.

In an exemplary embodiment of the present invention, a memory management method for a rewritable non-volatile memory module is provided. The rewritable non-volatile memory module has a plurality of memory cells, the memory cells constitute a plurality of physical pages, the physical pages constitute a plurality of physical blocks, each of the memory cells includes a plurality of storage states, and the storage states at least include a first storage state and a second storage state. The memory management method includes: recording a value of a wearing degree of each of the physical pages and operating the rewritable non-volatile memory module according to the values of the wearing degrees of the physical pages. Here, the step of recording the value of the wearing degree of each of the physical pages includes: programming a first physical page of the physical pages to write data into the first physical page; applying a first detection bias to the first physical page to read data from the first physical page and calculating a first error bit amount in the data read by applying the first detection bias to the first physical page; applying a second detection bias to the first physical page to read data from the first physical page and calculating a second error bit amount in the data read by applying the second detection bias to the first physical page; estimating the value of the wearing degree of the first physical page according to the first error bit amount and the second error bit amount. Here, the first detection bias is higher than the second detection bias, the first detection bias is lower than a verification bias corresponding to the second storage state, and the second detection bias is higher than a verification bias corresponding to the first storage state.

In an exemplary embodiment of the present invention, a memory controller for controlling a rewritable non-volatile memory module is provided. The rewritable non-volatile memory module has a plurality of memory cells, the memory cells constitute a plurality of physical pages, the physical pages constitute a plurality of physical blocks, each of the memory cells includes a plurality of storage states, and the storage states at least include a first storage state and a second storage state. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is configured to record a value of a wearing degree of each of the physical pages and operate the rewritable non-volatile memory module according to the values of the wearing degrees of the physical pages. In the operation of recording the value of the wearing degree of each of the physical pages, the memory management circuit programs a first physical page of the physical pages to write data into the first physical page, applies a first detection bias to the first physical page to read data from the first physical page and calculates a first error bit amount in the data read by applying the first detection bias to the first physical page, applies a second detection bias to the first physical page to read data from the first physical page and calculates a second error bit amount in the data read by applying the second detection bias to the first physical page, and estimates the value of the wearing degree of the first physical page according to the first error bit amount and the second error bit amount. Here, the first detection bias is higher than the second detection bias, the first detection bias is lower than a verification bias corresponding to the second storage state, and the second detection bias is higher than a verification bias corresponding to the first storage state.

In an exemplary embodiment of the present invention, a memory storage apparatus that includes a connector, a rewritable non-volatile memory module, and a memory controller is provided. The connector is configured to couple to a host system. The rewritable non-volatile memory module has a plurality of memory cells, the memory cells constitute a plurality of physical pages, the physical pages constitute a plurality of physical blocks, each of the memory cells includes a plurality of storage states, and the storage states at least include a first storage state and a second storage state. The memory controller is coupled to the connector and the rewritable non-volatile memory module. The memory controller is configured to record a value of a wearing degree of each of the physical pages and operate the rewritable non-volatile memory module according to the values of the wearing degrees of the physical pages. In the operation of recording the value of the wearing degree of each of the physical pages, the memory controller programs a first physical page of the physical pages to write data into the first physical page, applies a first detection bias to the first physical page to read the data from the first physical page and calculates a first error bit amount in the data read by applying the first detection bias to the first physical page, applies a second detection bias to the first physical page to read data from the first physical page and calculates a second error bit amount in the data read by applying the second detection bias to the first physical page, and estimates the value of the wearing degree of the first physical page according to the first error bit amount and the second error bit amount. Here, the first detection bias is higher than the second detection bias, the first detection bias is lower than a verification bias corresponding to the second storage state, and the second detection bias is higher than a verification bias corresponding to the first storage state.

In view of the above, through the memory management method, the memory controller, and the memory storage apparatus described in an exemplary embodiment of the present invention, the wearing degree of memory cells may be effectively identified, and the way to operate the rewritable non-volatile memory module may be correspondingly adjusted, so as to correctly write data into the memory cells and prevent data loss.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
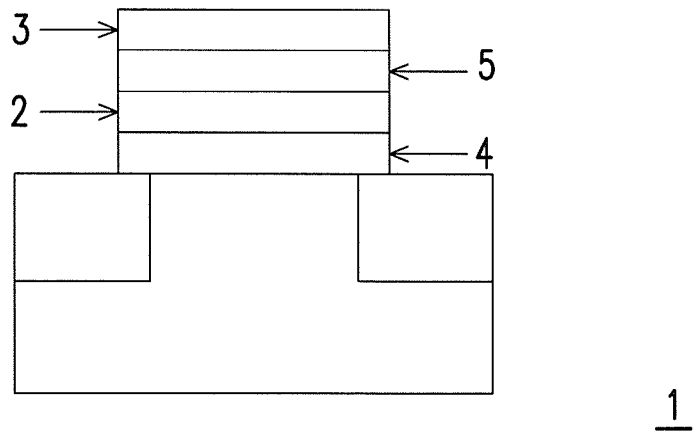
FIG. 1 is a schematic diagram illustrating a flash memory device according to the related art.

Reference will now be made in detail to the present exemplary embodiments of the present invention, examples of which are illustrated in the accompanying drawings. Wherever possible, the same reference numbers are used in the drawings and the description to refer to the same or like parts. Embodiments of the present invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. It is to be noted that the term "a" or "an" entity refers to one or more of that entity. As such, the terms "a" (or "an"), "one or more," and "at least one" can be used interchangeably herein.

Figure 2:
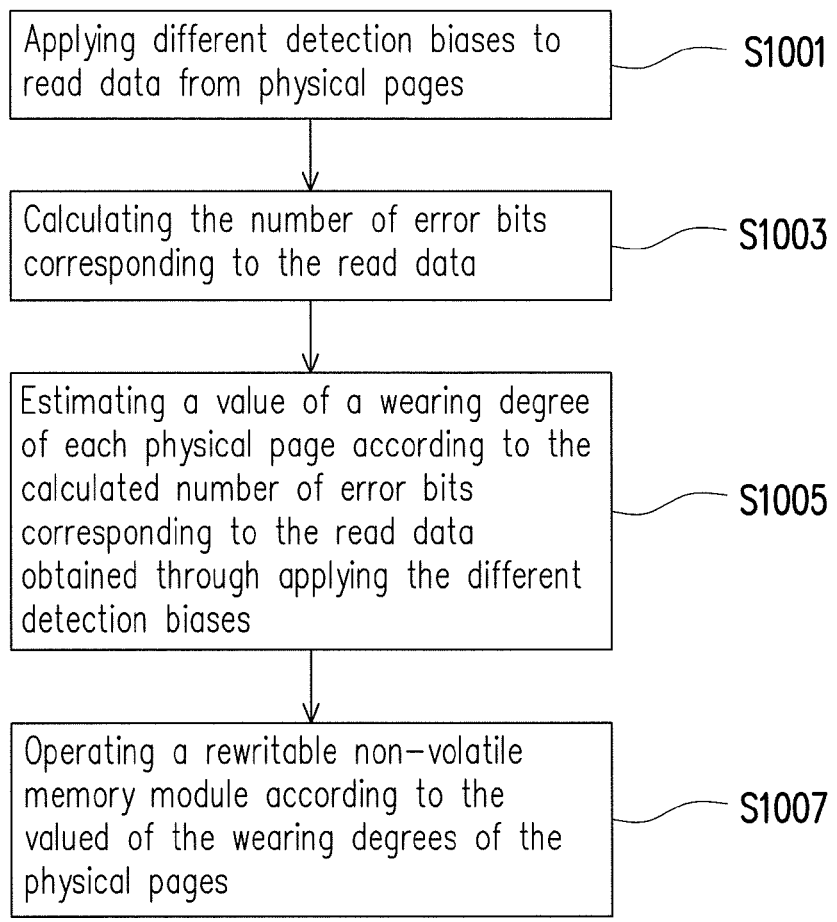
FIG. 2 is a flow chart illustrating a memory management method according to an exemplary embodiment of the present invention.

During writing and erasing operations, the structure (e.g., a tunnel oxide layer) of a flash memory device may be partially worn out due to the frequent injection and removal of electrons, thus increasing the speed of writing the electrons and extending the distribution of the threshold voltage. In order to store data accurately, as shown in FIG. 2, the memory management method described in an exemplary embodiment includes applying different detection biases to read data from physical pages (step S1001); calculating the number of error bits corresponding to the read data (step S1003); estimating a value of a wearing degree of each physical page according to the calculated number of error bits corresponding to the read data (step S1005) obtained through applying the different detection biases; operating a rewritable non-volatile memory module according to the values of the wearing degrees of the physical pages (step S1007). In order to make the aforementioned and other features and advantages of the present invention more comprehensible, several embodiments accompanied with figures are described in detail below.

First Exemplary Embodiment

A memory storage apparatus (also referred to as a memory storage system) typically includes a rewritable non-volatile memory module and a controller (also referred to as a control circuit). The memory storage apparatus is usually used together with a host system, such that the host system can write data into or read data from the memory storage apparatus.

Figure 3:
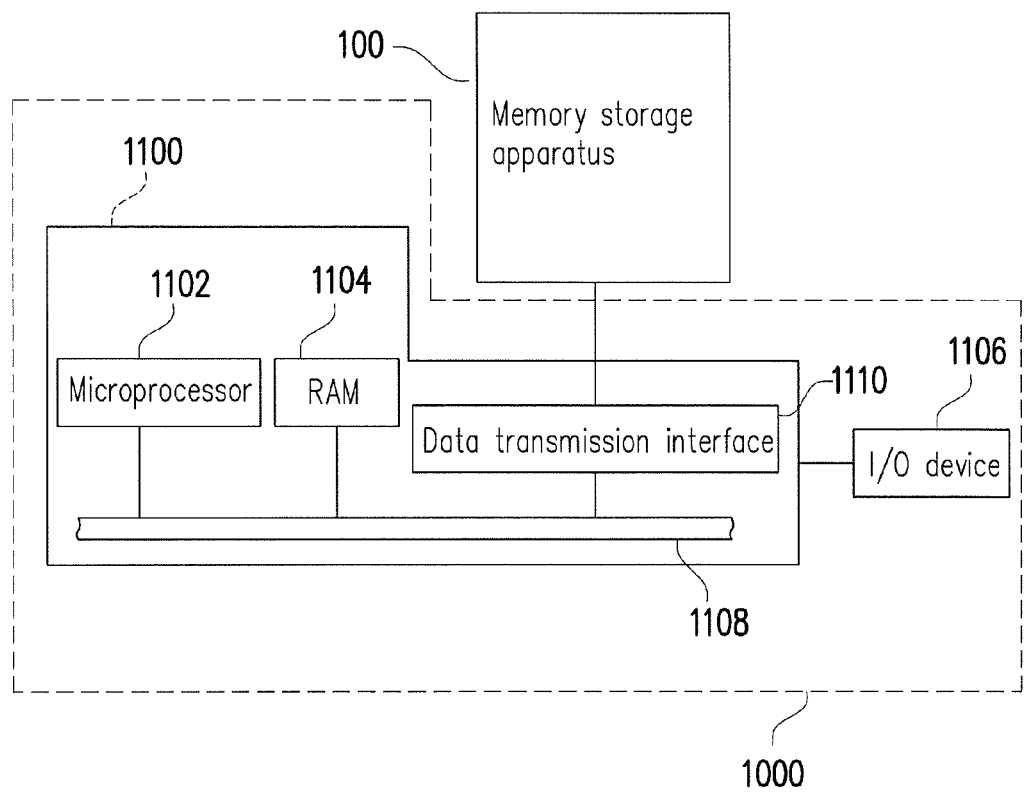
FIG. 3 illustrates a host system and a memory storage apparatus according to a first exemplary embodiment of the present invention.

FIG. 3 illustrates a host system and a memory storage apparatus according to the first exemplary embodiment of the present invention.

Figure 4:
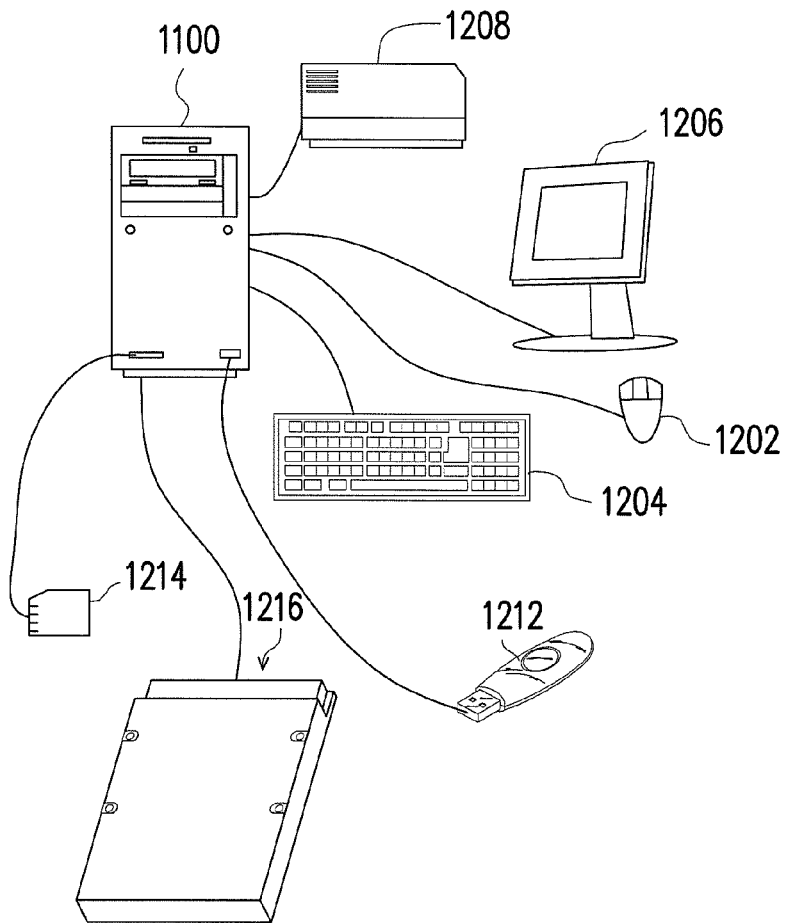
FIG. 4 is a schematic diagram illustrating a computer, an input/output (I/O) device, and a memory storage apparatus according to an exemplary embodiment of the present invention.

With reference to FIG. 3, a host system 1000 normally includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1252 as shown in FIG. 4. It should be understood that the I/O device 1106 is not limited to include the devices shown in FIG. 4 and may further include other devices.

In the exemplary embodiment of the present invention, the memory storage apparatus 100 is coupled to other devices of the host system 1000 through the data transmission interface 1110. By operating the microprocessor 1102, the RAM 1104, and the I/O device 1106, the data can be written into or read from the memory storage apparatus 100. For instance, the memory storage apparatus 100 may be a rewritable non-volatile memory storage apparatus, such as a flash drive 1256, a memory card 1214, or a solid state drive (SSD) 1216 shown in FIG. 4.

Figure 5:
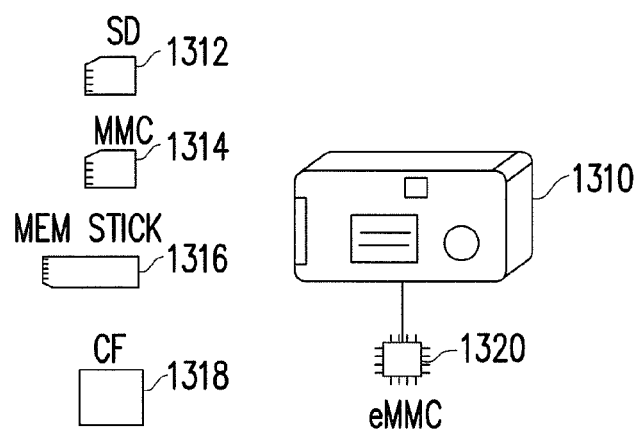
FIG. 5 a schematic diagram illustrating a host system and a memory storage apparatus according to an exemplary embodiment of the present invention.

Generally, the host system 1000 can substantially be any system operated together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so forth. For instance, if the host system is a digital camera (video camera) 1310, the rewritable non-volatile memory storage apparatus is then an SD card 1312, an MMC card 1314, a memory stick 1316, a CF card 1318, or an embedded storage apparatus 1320 (as shown in FIG. 5). The embedded storage apparatus 1320 includes an embedded MMC (eMMC). It should be mentioned that the eMMC is directly coupled to the substrate of the host system.

Figure 6:
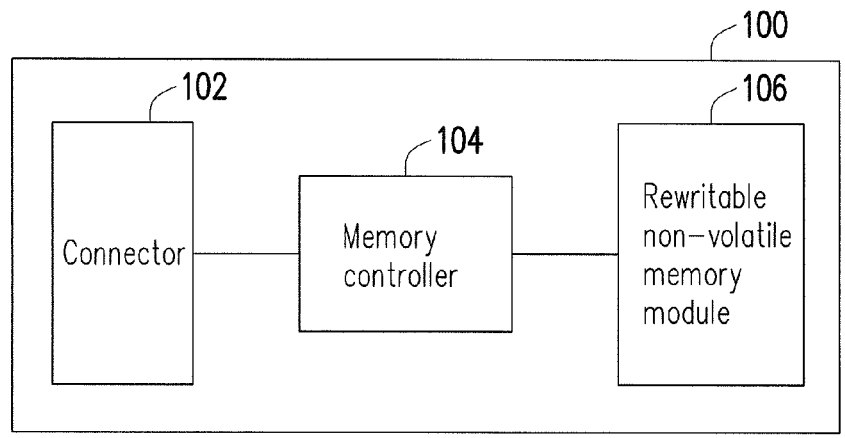
FIG. 6 is a schematic block diagram illustrating a memory storage apparatus according to a first exemplary embodiment of the present invention.

FIG. 6 is a schematic block diagram illustrating a memory storage apparatus according to the first exemplary embodiment of the present invention.

With reference to FIG. 6, the memory storage apparatus 100 includes a connector 102, a memory controller 104, and a rewritable non-volatile memory module 106.

In the present exemplary embodiment, the connector 102 complies with a universal serial bus (USB) standard. However, it should be understood that the present invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the secure digital (SD) standard, the serial advanced technology attachment (SATA) standard, the ultra high speed-I (UHS-I) interface standard, the ultra high speed-II (UHS-II) interface standard, the memory stick (MS) interface standard, the multi media card (MMC) interface standard, the eMMC interface standard, the universal flash storage (UFS) interface standard, the compact flash (CF) standard, the integrated device electronics (IDE) standard, or other suitable standards.

The memory controller 104 is configured to execute a plurality of logic gates or control instructions implemented in a hardware form or a firmware form and perform various data operations (e.g., data writing, reading, and erasing) in the rewritable non-volatile memory module 106 according to commands issued by the host system 1000.

The rewritable non-volatile memory module 106 is coupled to the memory controller 104 and configured to store data written by the host system 1000. In the present exemplary embodiment, the rewritable non-volatile memory module 106 is a multi-level cell (MLC) NAND flash memory module (i.e., a flash memory module capable of storing data of 2 bits in one memory cell). However, the present invention is not limited thereto, and the rewritable non-volatile memory module 106 may also be a single-level cell (SLC) NAND flash memory module (i.e., a flash memory module capable of storing data of 1 bit in one memory cell), a trinary-level cell (TLC) NAND flash memory module (i.e., a flash memory module capable of storing data of 3 bits in one memory cell), other flash memory modules, or other memory modules having the same characteristics.

Figure 7:
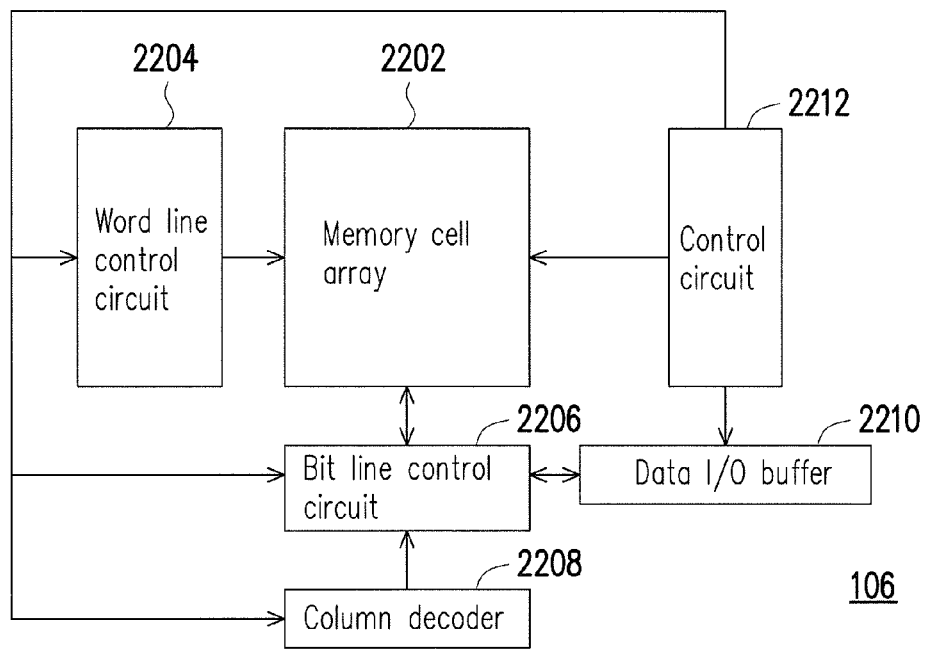
FIG. 7 is a schematic block diagram illustrating a rewritable non-volatile memory module according to the first exemplary embodiment of the present invention.

FIG. 7 is a schematic block diagram illustrating a rewritable non-volatile memory module according to the first exemplary embodiment of the present invention.

With reference to FIG. 7, the rewritable non-volatile memory module 106 includes a memory cell array 2202, a word line control circuit 2204, a bit line control circuit 2206, a column decoder 2208, a data input/output (I/O) buffer 2210, and a control circuit 2212.

Figure 8:
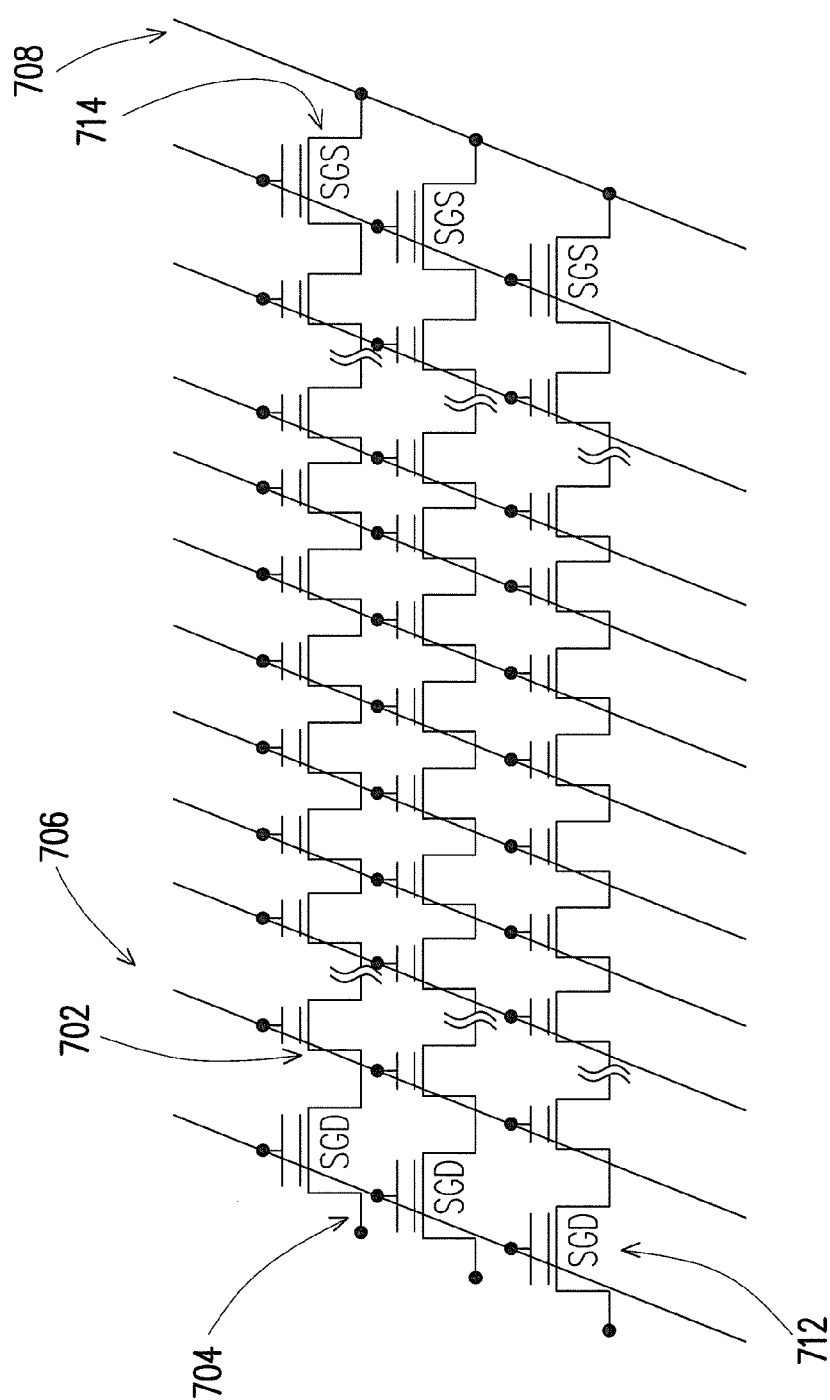
FIG. 8 is a schematic diagram illustrating a memory cell array according to an exemplary embodiment of the present invention.

The memory cell array 2202 includes a plurality of memory cells 702 for storing data, a plurality of select gate drain (SGD) transistors 712, a plurality of select gate source (SGS) transistors 714, a plurality of bit lines 704 for connecting the memory cells, a plurality of word lines 706, and a common source line 708 (as shown in FIG. 8). The memory cells 702 are disposed on the cross points of the bit lines 704 and the word lines 706 as an array. When a write command or a read command is received from the memory controller 104, the control circuit 2212 controls the word line control circuit 2204, the bit line control circuit 2206, the column decoder 2208, and the data I/O buffer 2210 to write data into the memory cell array 2202 or read data from the memory cell array 2202, wherein the word line control circuit 2204 is configured to control the bias applied to the word lines 706, the bit line control circuit 2206 is configured to control the bias applied to the bit lines 704, the column decoder 2208 selects the corresponding bit line according to the decoding column address in the command, and the data I/O buffer 2210 is configured to store the data temporarily.

In the present exemplary embodiment, the rewritable non-volatile memory module 106 is an MLC NAND flash memory module which employs a plurality of gate voltages for representing a multi-bit data. To be specific, each memory cell of the memory cell array 2202 has a plurality of states, and the states are distinguished by a plurality of threshold voltages.

Figure 9:
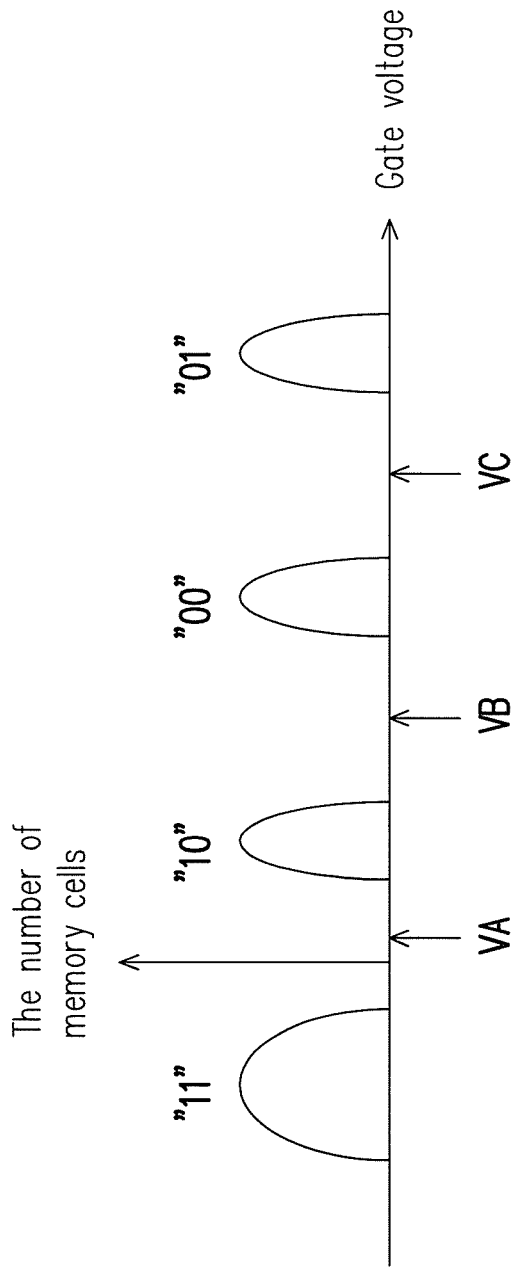
FIG. 9 is a statistical distribution diagram illustrating gate voltages corresponding to data stored in a memory array according to an exemplary embodiment of the present invention.

FIG. 9 is a statistical distribution diagram illustrating gate voltages corresponding to data stored in a memory array according to an exemplary embodiment of the present invention.

With reference to FIG. 9, in an exemplary MLC NAND flash memory, the gate voltages in each memory cell may be categorized into 4 storage states according to a first threshold bias VA, a second threshold bias VB, and a third threshold bias VC, and these storage states respectively represent "11," "10," "00," and "01." In other words, each storage state includes the least significant bit (LSB) and the most significant bit (MSB). In the present exemplary embodiment, the first bit from the left of the storage states (i.e., "11", "10", "00", and "01") is the LSB, and the second bit from the left of the storage states is the MSB. Therefore, in the first exemplary embodiment, each memory cell stores 2 bits of data. It should be understood that the gate voltages and the corresponding storage states illustrated in FIG. 8 are only examples. In another exemplary embodiment of the present invention, the gate voltages and the corresponding storage states may also have such an arrangement as "11", "10", "01", and "00" along with the increase in the gate voltages. Alternatively, the storage states corresponding to the gate voltages may also be values obtained by mapping or inverting actual storage values. Besides, in yet anther exemplary embodiment, the first bit from the left may be defined as the MSB, and the second bit from the left may be defined as the LSB.

In the present exemplary embodiment, each memory cell stores 2 bits of data; hence, the memory cells on the same word line constitute a storage space of 2 physical pages (i.e., a lower page and an upper page). Namely, the LSB of each memory cell corresponds to the lower page, and the MSB of each memory cell corresponds to the upper page. In addition, several physical pages in the memory cell array 2202 constitute a physical block, and the physical block is the smallest unit for erasing data. Namely, each physical block contains the least number of memory cells which are erased all together.

To write (or to program) data to a memory cell of the memory cell array 2202, a voltage (e.g., a gate voltage) applied to a certain terminal in the memory cell is controlled to change the electron volume in a charge-trapping layer in the gate, so that the conduction state of the channel of the memory cell is changed to present a different storage state. For instance, when the data of the lower page is 1, and the data of the upper page is 1 as well, the control circuit 2212 controls the word line control circuit 2204 not to change the gate voltage in the memory cell, so as to keep the storage state of the memory cell as "11". When the data of the lower page is 1, and the data of the upper page is 0, the control circuit 2212 controls the word line control circuit 2204 to change the gate voltage in the memory cell, so as to change the storage state of the memory cell to "10". When the data of the lower page is 0, and the data of the upper page is 0 as well, the control circuit 2212 controls the word line control circuit 2204 to change the gate voltage in the memory cell, so as to change the storage state of the memory cell to "00". When the data of the lower page is 0, and the data of the upper page is 1, the control circuit 2212 controls the word line control circuit 2204 to change the gate voltage in the memory cell, so as to change the storage state of the memory cell to "01".

Figure 10:
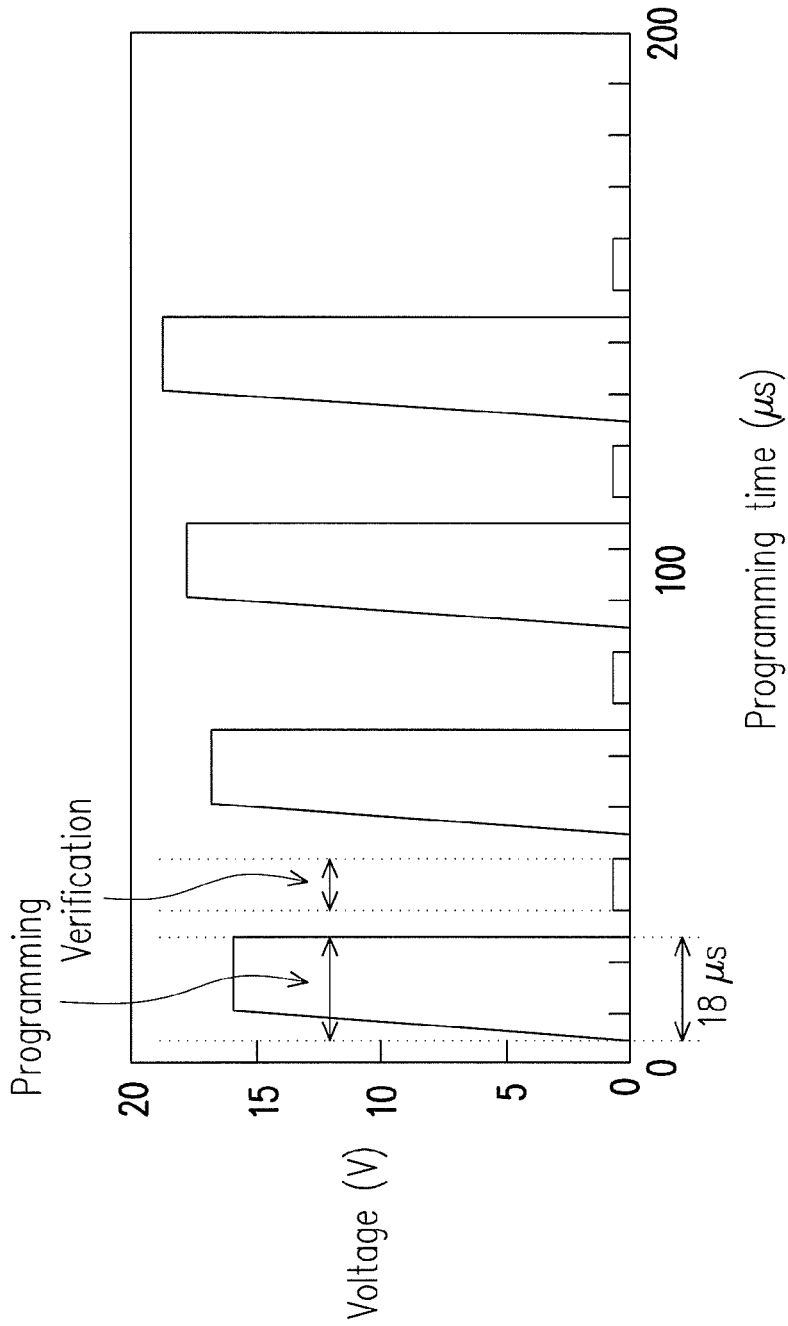
FIG. 10 is a schematic diagram of programming a memory cell according to an exemplary embodiment of the present invention.

FIG. 10 is a schematic diagram of programming a memory cell according to an exemplary embodiment of the present invention.

With reference to FIG. 10, in the present exemplary embodiment, the memory cell is programmed through applying a pulse writing/threshold voltage verifying method. Particularly, when data are to be written into the memory cell, the memory controller 104 determines an initial writing bias and a writing bias pulse time and instructs the control circuit 2212 of the rewritable non-volatile memory module 106 to program the memory cell according to the determined initial writing bias and the determined writing bias pulse time, thereby writing the data into the memory cell. The memory controller 104 then verifies the memory cell by means of a verification bias, so as to determine whether the memory cell is in the correct storage state. If the memory cell is not programmed to be in the correct storage state, the memory controller 104 instructs the control circuit 2212 to re-program the memory cell according to the determined writing bias pulse time and a new writing bias (also referred to as a repetitive writing bias) obtained by adding an incremental-step-pulse programming (ISPP) adjustment value to the initial writing bias. By contrast, if the programmed memory cell is in the correct storage state, it indicates that the data are correctly written into the memory cell. For instance, the initial writing bias is set as 16 voltages (V), the writing bias pulse time is set as 18 microseconds (μs), and the ISPP adjustment value is set as 0.6 V; however, the present invention is not limited thereto.

Figure 11:
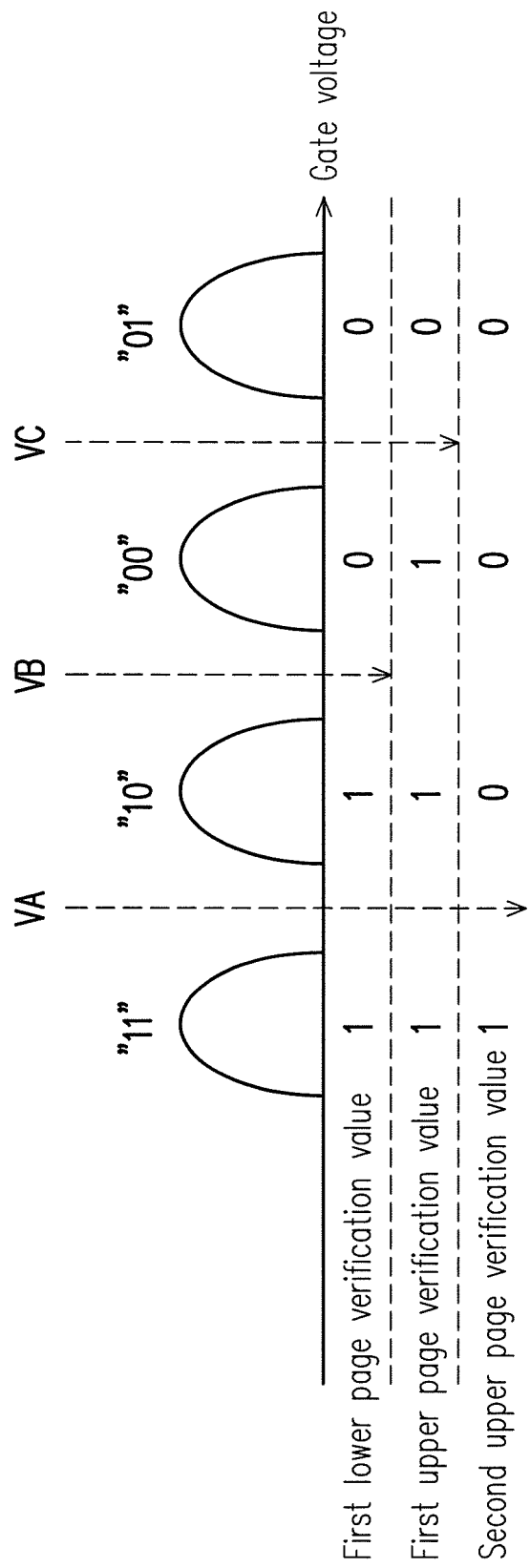
FIG. 11 is a schematic diagram of reading data from a memory cell according to an exemplary embodiment of the present invention.

FIG. 11 is a schematic diagram of reading data from a memory cell according to an exemplary embodiment of the present invention.

With reference to FIG. 11, in order to read data from a memory cell of the memory cell array 2202, a bias for reading data is applied to a control gate; by means of the conduction state of a channel of the memory cell, the data stored in the memory cell may be indicated. Here, the channel of the memory cell refers to an electrical connection path between the bit lines and the source lines of the memory cell (e.g., the path between the source and the drain of the memory cell). In an operation for reading data from a lower page, the word line control circuit 2204 applies the second threshold bias VB (as the bias for reading data) to the memory cell and determines the value of data of the lower page according to whether the channel of the memory cell is conducted and the corresponding expression (1):

$$LSB=(VB)\text{Lower\_pre1} \qquad (1)$$

In the expression (1), (VB)Lower_pre1 represents a first lower page verification value obtained by applying the second threshold bias VB.

For instance, when the second threshold bias VB is lower than the gate voltage in the memory cell, the channel of the memory cell is not conducted, and a first lower page verification value, which is '0', is output. Accordingly, the LSB is indicated to be in a first state as 0. When the second threshold bias VB is higher than the gate voltage in the memory cell, the channel of the memory cell is conducted, and the first lower page verification value, which is '1', is output. Accordingly, the LSB is indicated as being in a second state. Here, the first state is indicated as "0," and the second state is indicated as "1". That is, the gate voltage for presenting the LSB as "1" and the gate voltage for presenting the LSB as "0" may be distinguished by the second threshold bias VB.

In an operation for reading data from an upper page, the word line control circuit 2204 respectively applies the third threshold bias VC and the first threshold bias VA (collectively as the bias for reading data) to the memory cell and determines the value of data of the upper page according to whether the channel of the memory cell is conducted and the corresponding expression (2):

$$MSB=((VA)\text{Upper\_pre2})\text{xor}(\sim(VC)\text{Upper\_pre1}) \qquad (2)$$

In the expression (2), (VC)Upper_pre1 represents a first upper page verification value obtained by applying the third threshold bias VC, and (VA) Upper_pre2 represents a second upper page verification value obtained by applying the first threshold bias VA, wherein the symbol "~" represents inversion. Additionally, in the present exemplary embodiment, when the third threshold bias VC is lower than the gate voltage in the memory cell, the channel of the memory cell is not conducted, and the first upper page verification value ((VC) Upper_pre1), which is '0', is output; when the first threshold bias VA is lower than the gate voltage in the memory cell, the channel of the memory cell is not conducted, and a second upper page verification value ((VA) Upper_pre2), which is '0', is output.

Thus, in the present exemplary embodiment, according to the expression (2), it is assumed that the third threshold bias VC and the first threshold bias VA are both lower than the gate voltage in the memory cell. When the third threshold bias VC is applied, the channel of the memory cell is not conducted, and a first upper page verification value, which is '0', is output; when the first threshold bias VA is applied, the channel of the memory cell is not conducted, and a second upper page verification value, which is '0', is output. At this time, the MSB is indicated as being in the second state, i.e., "1".

For instance, it is assumed that the third threshold bias VC is higher than the gate voltage of the memory cell, and the first threshold bias VA is lower than the gate voltage of the memory cell. When the third threshold bias VC is applied, the channel of the memory cell is conducted, and a first upper page verification value, which is '1', is output; when the first threshold bias VA is applied, the channel of the memory cell is not conducted, and a second upper page verification value, which is '0', is output. At this time, the MSB is indicated as being in a first state, i.e., "0".

For instance, it is assumed that the third threshold bias VC and the first threshold bias VA are both higher than the gate voltage of the memory cell. When the third threshold bias VC is applied, the channel of the memory cell is conducted, and a first upper page verification value, which is '1', is output; when the first threshold bias VA is applied, the channel of the memory cell is conducted, and a second upper page verification value, which is '1', is output. At this time, the MSB is indicated as being in the second state, i.e., "1".

It should be understood that the exemplary MLC NAND flash memory described herein should not be construed as limitation to the present invention, and data can be read from any other MLC NAND flash memory through the principle described above.

Figure 12:
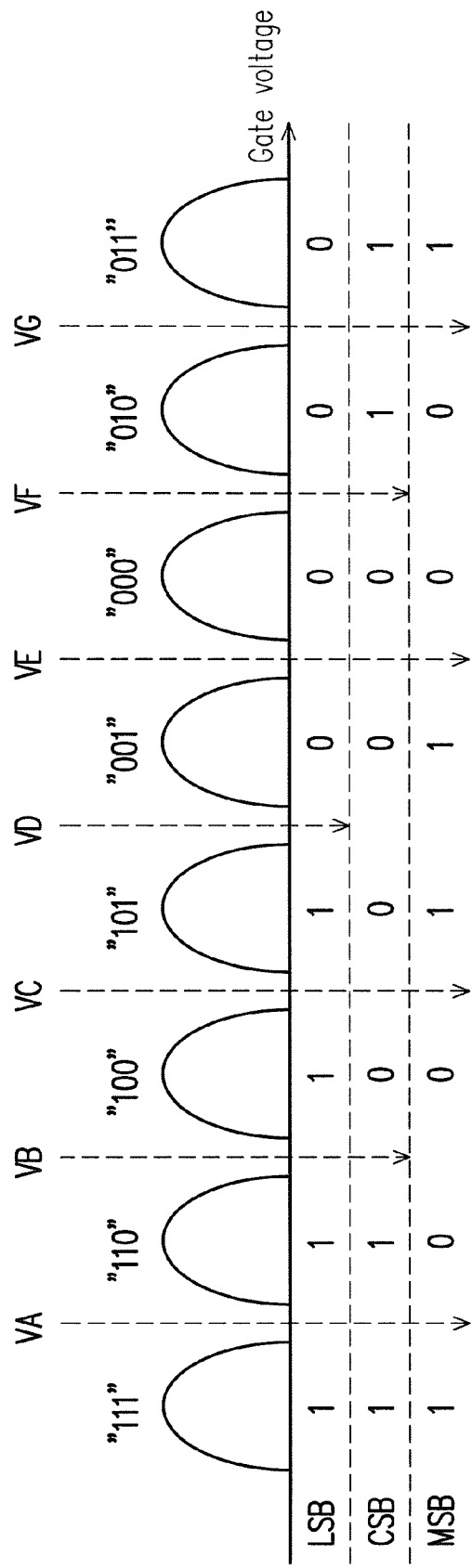
FIG. 12 is a schematic diagram of reading data from a memory cell according to another exemplary embodiment of the present invention.

For instance, in an exemplary TLC NAND flash memory (as shown in FIG. 12), each storage state includes an LSB (the first bit from the left), a center significant bit (CSB, the second bit from the left), and an MSB (the third bit from the left), wherein the LSB corresponds to a lower page, the CSB corresponds to a center page, and the MSB corresponds to an upper page. In this example, the gate voltage in each memory cell is distinguished into 8 storage states (i.e., "111", "110", "100", "101", "001", "000", "010", and "011") according to a first threshold bias VA, a second threshold bias VB, a third threshold bias VC, a fourth threshold bias VD, a fifth threshold bias VE, a sixth threshold bias VF, and a seventh threshold bias VG. Moreover, in an exemplary SLC NAND flash memory (not shown), only 1 bit of data is stored in a storage state, and thus the gate voltage in each memory cell recognizes the storage states (i.e., "1" and "0") of the memory cell according to a threshold bias.

Figure 13:
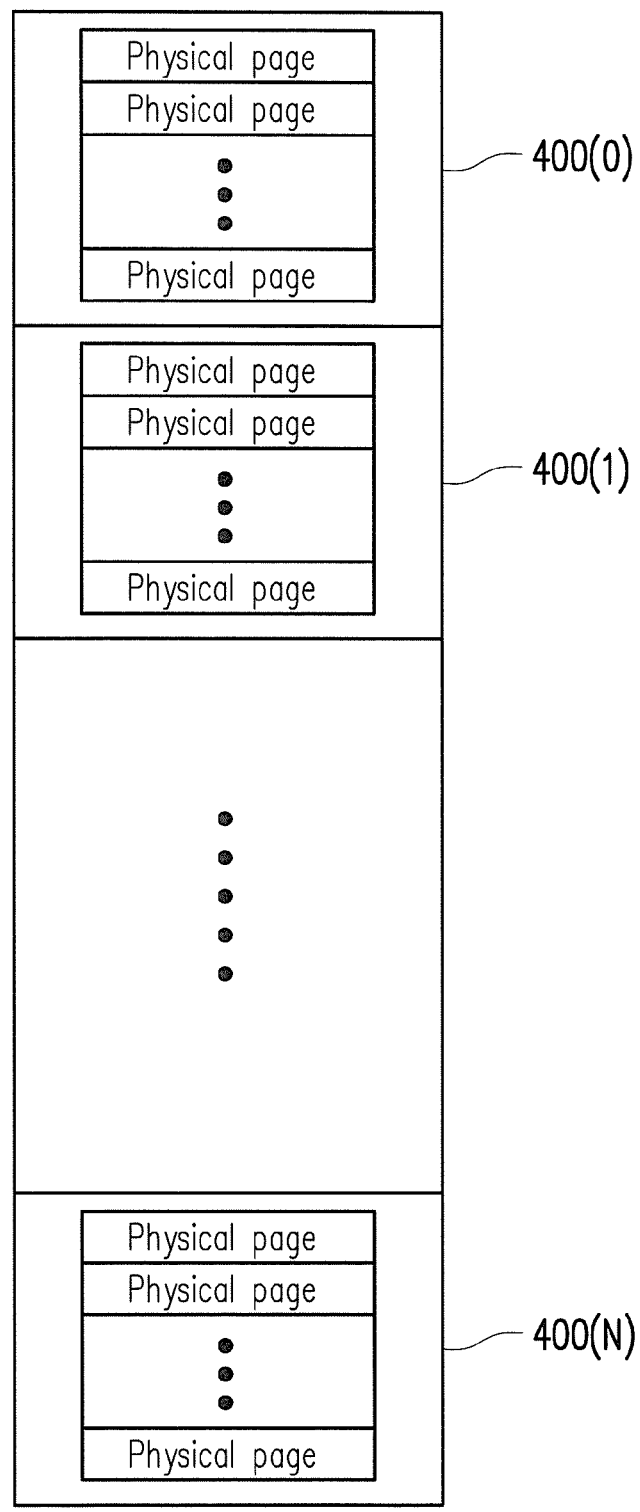
FIG. 13 is a schematic diagram of managing a rewritable non-volatile memory module according to an exemplary embodiment of the present invention.

FIG. 13 is a schematic diagram of managing a rewritable non-volatile memory module according to an exemplary embodiment of the present invention.

With reference to FIG. 13, the memory controller 104 (or the memory management circuit 202) writes data into the memory cells 702 of the rewritable non-volatile memory module 106 in units of each physical page and erases data from the memory cells 702 of the rewritable non-volatile memory module 106 in units of each physical block. Particularly, the memory cells 702 in the rewritable non-volatile memory module 106 constitute a plurality of physical pages, and the physical pages constitute a plurality of physical blocks 400(0)-400(N). Each physical block is the smallest unit for erasing data. Namely, each physical block contains the least number of memory cells which are erased all together. Each physical page is the smallest unit for programming data. Namely, each physical page is the smallest unit for writing data. Each physical page usually includes a data bit area and a redundant bit area. The data bit area includes a plurality of physical access addresses for storing data of users, and the redundant bit area is configured for storing system data (e.g., control information and error correcting codes). In the present exemplary embodiment, the LSBs of the memory cells on the same word line constitute a lower physical page; the CSBs of the memory cells on the same word line constitute a center physical page; the MSBs of the memory cells on the same word line constitute an upper physical page.

Figure 14:
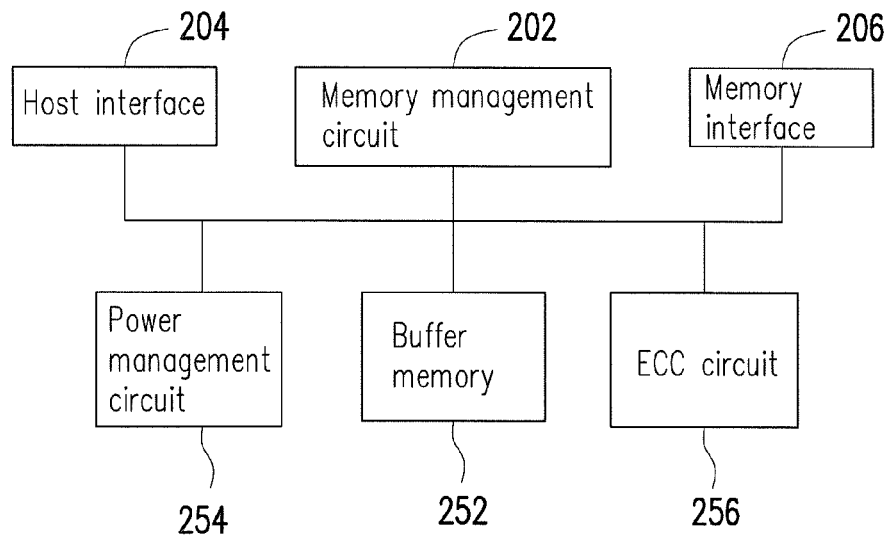
FIG. 14 is a schematic block diagram illustrating a memory controller according to an exemplary embodiment of the present invention.

FIG. 14 is a schematic block diagram illustrating a memory controller according to an exemplary embodiment of the present invention. It should be understood that the structure of the memory controller depicted in FIG. 14 is merely exemplary and should not be construed as a limitation to the present invention.

With reference to FIG. 14, the memory controller 104 includes a memory management circuit 202, a host interface 204, and a memory interface 206.

The memory management circuit 202 is configured to control the overall operation of the memory controller 104. Particularly, the memory management circuit 202 has a plurality of control instructions; when the memory storage apparatus 100 is operated, the control instructions are executed to perform a data writing operation, a data reading operation, a data erasing operation, and so on.

In the present exemplary embodiment, the control instructions of the memory management circuit 202 are implemented in a firmware form. For instance, the memory management circuit 202 has a microprocessor unit (not shown) and a read-only memory (ROM, not shown), and these control instructions are burnt into the ROM. When the memory storage apparatus 100 is in operation, the control instructions are executed by the microprocessor unit to write, read, and erase data.

In another exemplary embodiment of the present invention, the control instructions of the memory management circuit 202 may also be stored in a specific area of the rewritable non-volatile memory module 106 (e.g., a system area of a memory module exclusively used for storing system data) in form of program codes. Additionally, the memory management circuit 202 may have a microprocessor unit (not shown), a ROM (not shown), and a RAM (not shown). In particular, the ROM has boot codes, and when the memory controller 104 is enabled, the microprocessor unit first executes the boot codes to load the control instructions from the rewritable non-volatile memory module 106 into the RAM of the memory management circuit 202. The microprocessor unit then executes the control instructions to write, read, and erase data.

Moreover, the control instructions of the memory management circuit 202 may also be implemented in a hardware form according to another exemplary embodiment of the present invention. For instance, the memory management circuit 202 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage physical blocks of the rewritable non-volatile memory module 106. The memory writing circuit is configured to issue a write command to the rewritable non-volatile memory module 106 for writing data thereto. The memory reading circuit is configured to issue a read command to the rewritable non-volatile memory module 106 for reading data therefrom. The memory erasing circuit is configured to issue an erase command to the rewritable non-volatile memory module 106 for erasing data therefrom. The data processing circuit is configured to process data to be written to the rewritable non-volatile memory module 106 or data read from the rewritable non-volatile memory module 106.

The host interface 204 is coupled to the memory management circuit 202 and configured to receive and identify commands and data transmitted by the host system 1000. Namely, the commands and data from the host system 1000 are transmitted to the memory management circuit 202 through the host interface 204. In the present exemplary embodiment, the host interface unit 204 complies with the USB standard. However, it should be understood that the present invention is not limited thereto, and the host interface 204 may comply with the PATA standard, the IEEE 1394 standard, the PCI express standard, the SD standard, the SATA standard, the UHS-I interface standard, the UHS-II interface standard, the MS standard, the MMC standard, the eMMC interface standard, the UFS interface standard, the CF standard, the IDE standard, or other suitable data transmission standards.

The memory interface 206 is coupled to the memory management circuit 202 and configured to access the rewritable non-volatile memory module 106. Namely, data to be written into the rewritable non-volatile memory module 106 may be converted by the memory interface 206 into a format acceptable to the rewritable non-volatile memory module 106.

In an exemplary embodiment of the present invention, the memory controller 104 further includes a buffer memory 252, a power management circuit 254, and an error checking and correcting (ECC) circuit 256.

The buffer memory 252 is coupled to the memory management circuit 202 and configured to temporarily store data and commands received from the host system 1000 or data received from the rewritable non-volatile memory module 106.

The power management circuit 254 is coupled to the memory management circuit 202 and configured to control the power of the memory storage apparatus 100.

The ECC circuit 256 is coupled to the memory management circuit 202 and configured to perform an ECC procedure to ensure data accuracy. In the present exemplary embodiment, when the memory management circuit 202 receives a write command from the host system 1000, the ECC circuit 256 generates an ECC code for data corresponding to the write command, and the memory management circuit 202 writes the data corresponding to the write command and the corresponding ECC code into the rewritable non-volatile memory module 106. Thereafter, when reading the data from the rewritable non-volatile memory module 106, the memory management circuit 202 simultaneously reads the corresponding ECC code, and the ECC circuit 256 executes the ECC procedure on the read data according to the corresponding ECC code. In particular, the ECC circuit 256 is configured to be capable of correcting a certain number of error bits (which is referred to as the maximum correctable error bit amount hereinafter). For instance, the maximum correctable error bit amount is 24. If the number of the error bits in the read data is equal to or less than 24, the ECC circuit 256 corrects the error bits back to the correct and accurate values according to the ECC code. Otherwise, the ECC circuit 256 reports a failure of error correcting, and the memory management circuit 202 transmits a message indicating data loss to the host system 1000.

In the present exemplary embodiment, when a writing operation is performed on the rewritable non-volatile memory module 106 (i.e., when the rewritable non-volatile memory module 106 is programmed, as shown in FIG. 10), the memory controller 104 (or the memory management circuit 202) further applies a detection bias to the physical page to which the data are written, so as to calculate a value of the wearing degree of the physical page. Particularly, when the verification bias is applied to make sure the programming step is completed, the memory controller 104 (or the memory management circuit 202) applies a first detection bias to the physical page to read the data from the physical page and calculates the number of error bits ("the first error bit amount" hereinafter) in the data read from the physical page to which the first detection bias is applied, applies a second detection bias to the physical page to read the data from the physical page and calculates the number of error bits ("the second error bit amount" hereinafter) in the data read from the physical page to which the second detection bias is applied, and estimates the difference between the first error bit amount and the second error bit amount. Said difference serves as a value of the wearing degree of this physical page. Here, the first detection bias is lower than a verification bias corresponding to one of the storage states ("the second storage state" hereinafter) of the memory cell, the second detection bias is higher than a verification bias corresponding to a preceding storage state ("the first storage state" hereinafter) of the second storage state, and the first detection bias is higher than the second detection bias. To be specific, in an exemplary embodiment, the second detection bias is set to be greater than the total of the ISPP adjustment value and the verification bias corresponding to the first storage state, which is more conducive to the estimation of the number of error bits.

Figure 15:
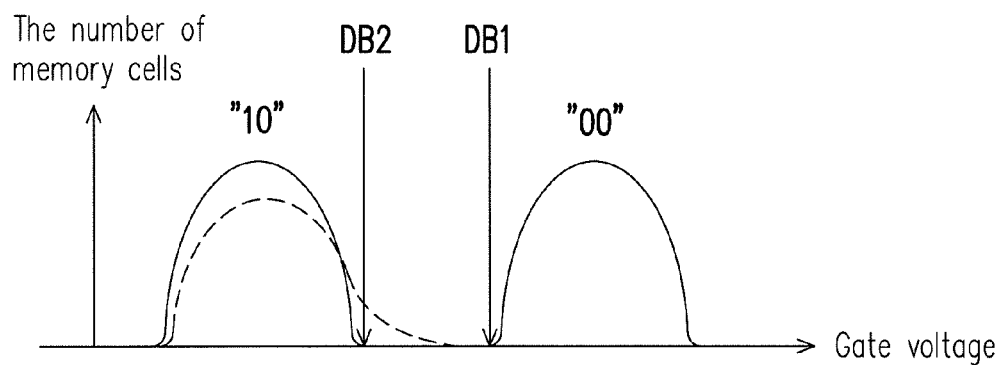
FIG. 15 is a schematic diagram of applying a detection bias according to an exemplary embodiment of the present invention.

FIG. 15 is a schematic diagram of applying a detection bias according to an exemplary embodiment of the present invention.

With reference to FIG. 15, in an exemplary MLC NAND flash memory, the storage states of a memory cell include the storage state "11", the storage state "10", the storage state "00", and the storage state "01". For instance, after data are written into the physical page, the memory controller 104 (or the memory management circuit 202) applies the first detection bias DB1 to the physical page to read the data from the physical page and calculates the number of the memory cells which is supposed to be in the storage state "10" but is erroneously identified to be in the storage "00" (i.e., the first error bit amount). The memory controller 104 (or the memory management circuit 202) then applies the second detection bias DB2 to the physical page to read the data from the physical page and calculates the number of the memory cells which is supposed to be in the storage state "10" but is erroneously identified to be in the storage "00" (i.e., the second error bit amount). Thereafter, the memory controller 104 (or the memory management circuit 202) estimates the difference between the first error bit amount and the second error bit amount in the physical page, and said difference serves as a value of the wearing degree of the physical page. Once the physical page is repeatedly used and is thus worn out (as shown by the dotted lines in FIG. 15), the number of the error bits in the memory cells increases; therefore, the difference between the first error bit amount and the second error bit amount increases as well, and the value of the wearing degree of the physical page is thus identifiable. That is, in the present exemplary embodiment, after programming, the memory controller (or the memory management circuit 202) compares the initial writing data with the read data, so as to obtain the number of error bits. It should be understood that the aforesaid method of estimating the value of the wearing degree of the physical page is merely exemplary and should not be construed as a limitation to the present invention. In another exemplary embodiment, the value of the wearing degree may be obtained through applying an equation. For instance, the value of the wearing degree may be obtained through dividing the second error bit amount by the first error bit amount, dividing the second error bit amount by the first error bit amount and taking the logarithm of the quotient, or dividing the second error bit amount by the first error bit amount and taking the natural logarithm of the quotient. Further, note that the storage state "10" and the storage state "00" respectively serve as the first storage state and the second storage state for estimating the value of the wearing degree of the physical page. However, the present invention is not limited thereto, and in another exemplary embodiment of the present invention, the first storage state and the second storage state for estimating the value of the wearing degree of the physical page may be the storage state "11" and the storage state "10", respectively. In still another exemplary embodiment, the first storage state and the second storage state may be the storage state "00" and the storage state "01", respectively.

As described above, in the present exemplary embodiment, after the physical page of the rewritable non-volatile memory module 106 is programmed, the memory controller 104 (or the memory management circuit 202) applies a detection bias to the physical page to which the data are written, so as to obtain the value of the wearing degree of the physical page. Nevertheless, in another exemplary embodiment, the memory controller 104 (or the memory management circuit 202) may estimate the value of the wearing degree of the physical page in the same manner as that described above after programming an ECC frame.

According to the present exemplary embodiment, the memory controller 104 (or the memory management circuit 202) records the value of the wearing degree of the physical page. For instance, the memory controller 104 (or the memory management circuit 202) stores the value of the wearing degree of each of the physical pages into the physical blocks of the rewritable non-volatile memory module 106. Here, the physical blocks may refer to the system physical blocks for storing system data. According to the present exemplary embodiment, the memory controller 104 (or the memory management circuit 202) performs a wear-leveling operation according to the value of the wearing degree of the physical page.

Figure 16:
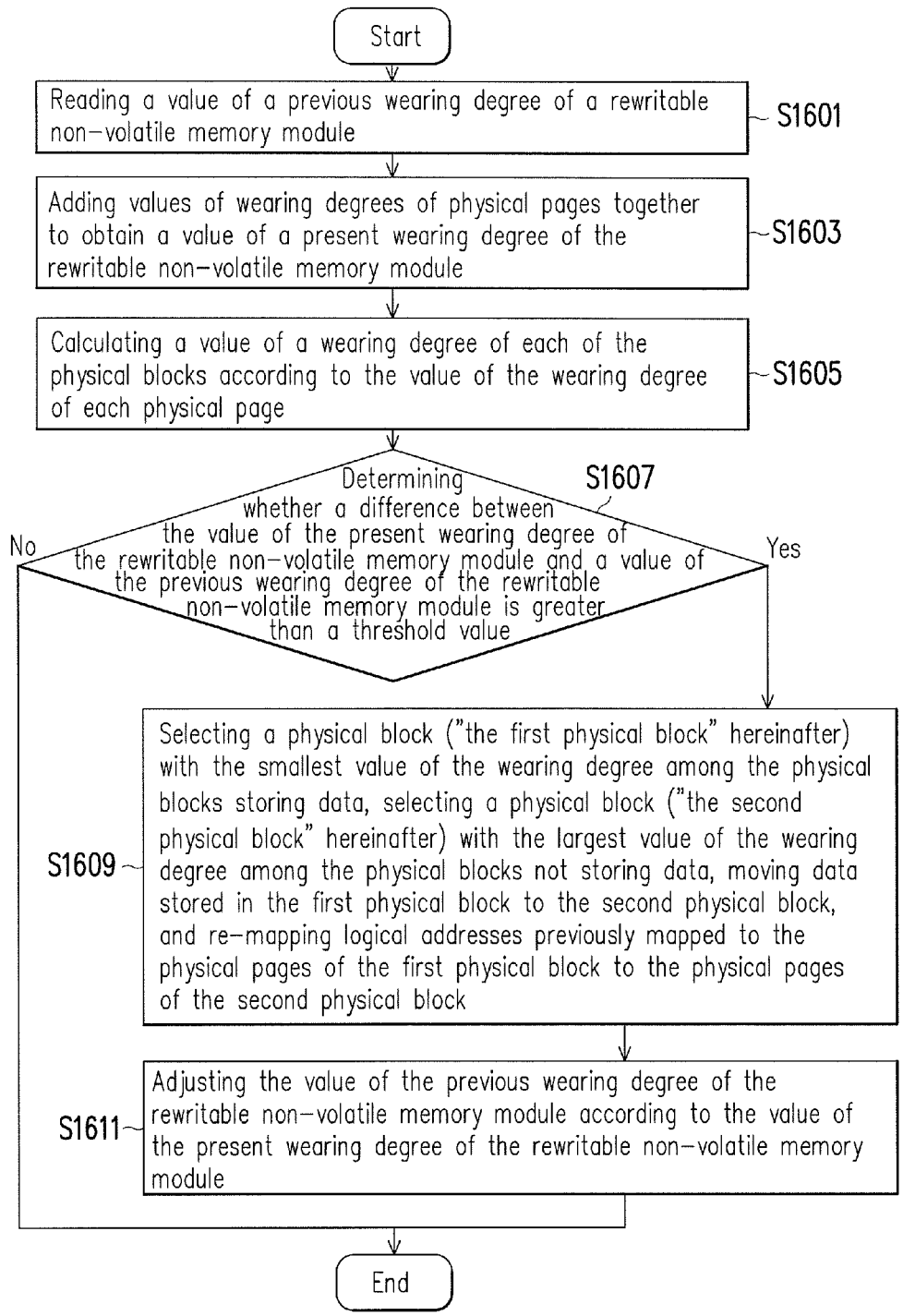
FIG. 16 is a flow chart illustrating a memory management method according to the first exemplary embodiment of the present invention.

FIG. 16 is a flow chart illustrating a memory management method according to the first exemplary embodiment of the present invention.

With reference to FIG. 16, in step S1601, the memory controller 104 (or the memory management circuit 202) reads a value of the previous wearing degree of the rewritable non-volatile memory module 106. For instance, when the memory storage apparatus 100 is activated, the memory controller 104 (or the memory management circuit 202) sets the value of the previous wearing degree as 0.

In step S1603, the memory controller 104 (or the memory management circuit 202) adds the values of the wearing degrees of the physical pages together to obtain a value of a present wearing degree of the rewritable non-volatile memory module 106.

In step S1605, the memory controller 104 (or the memory management circuit 202) calculates a value of a wearing degree of each of the physical blocks according to the value of the wearing degree of each physical page. For instance, the memory controller 104 (or the memory management circuit 202) calculates the average value of the wearing degrees of all the physical pages in one physical block, and the average value then serves as the value of the wearing degree of the physical block.

In step S1607, the memory controller 104 (or the memory management circuit 202) determines whether a difference between the value of the present wearing degree of the rewritable non-volatile memory module 106 and the value of the previous wearing degree of the rewritable non-volatile memory module 106 is greater than a threshold value. Here, the threshold value is set as 1000; however, the present invention is not limited thereto.

If the difference between the value of the present wearing degree of the rewritable non-volatile memory module 106 and the value of the previous wearing degree of the rewritable non-volatile memory module 106 is greater than the threshold value, in step S1609, the memory controller 104 (or the memory management circuit 202) selects a physical block ("the first physical block" hereinafter) with the smallest value of the wearing degree among the physical blocks storing data, selects a physical block ("the second physical block" hereinafter) with the largest value of the wearing degree among the physical blocks not storing data, moves data stored in the first physical block to the second physical block, and re-maps logical addresses previously mapped to the physical pages of the first physical block to the physical pages of the second physical block.

In step S1611, the memory controller 104 (or the memory management circuit 202) adjusts the value of the previous wearing degree of the rewritable non-volatile memory module 106 according to the value of the present wearing degree of the rewritable non-volatile memory module 106. Namely, the memory controller 104 (or the memory management circuit 202) sets the value of the previous wearing degree as the value of the present wearing degree.

If the difference between the value of the present wearing degree of the rewritable non-volatile memory module 106 and the value of the previous wearing degree of the rewritable non-volatile memory module 106 is less than or equal to the threshold value, the process of FIG. 16 is terminated.

Second Exemplary Embodiment

The structure of the memory storage apparatus described in the second exemplary embodiment is similar to that of the memory storage apparatus described in the first exemplary embodiment, while the difference therebetween lies in that the memory controller (or the memory management circuit) described in the second exemplary embodiment adjusts the initial writing bias applied in the process of programming the physical page according to the value of the wearing degree of the physical page. The reference numbers and characters used in the first exemplary embodiment are further utilized hereinafter to elaborate the difference between the first and second exemplary embodiments.

According to the value of the wearing degree of each physical page, the memory controller 104 (or the memory management circuit 202) described herein adjusts the initial writing bias applied in the process of programming the physical page, so as to adjust the quantity of electrons in the charge-trapping layer. Thereby, error bits caused by over-writing may be prevented. Specifically, the memory controller 104 (or the memory management circuit 202) lowers the initial writing bias corresponding to the physical page along with an increase in the value of the wearing degree of the physical page.

For instance, when a physical page is to be programmed, the memory controller 104 (or the memory management circuit 202) determines whether the value of the wearing degree of the physical page is less than a first threshold value. If the value of the wearing degree of the physical page is less than the first threshold value, the memory controller 104 (or the memory management circuit 202) uses a first writing bias as the initial writing bias. If the value of the wearing degree of the physical page is greater than or equal to the first threshold value, the memory controller 104 (or the memory management circuit 202) determines whether the value of the wearing degree of the physical page is less than a second threshold value. If the value of the wearing degree of the physical page is less than the second threshold value, the memory controller 104 (or the memory management circuit 202) uses a second writing bias as the initial writing bias. If the value of the wearing degree of the physical page is greater than or equal to the second threshold value, the memory controller 104 (or the memory management circuit 202) uses a third writing bias as the initial writing bias. Here, the second threshold value is greater than the first threshold value, the first writing bias is higher than the second writing bias, and the second writing bias is higher than the third writing bias. For instance, the first threshold value is 500, the second threshold value is 1000, the first writing bias is 16 V, the second writing bias is 14 V, and the third writing bias is 12 V. That is, as shown in table 1, when the memory controller 104 (or the memory management circuit 202) described in the present embodiment programs the physical page through applying a pulse writing method or a threshold voltage verification method, the writing biases (i.e., the initial writing bias Vpro_0, the first repetitive writing bias Vpro_1, the second repetitive writing bias Vpro_2, . . . ) utilized herein may differ from one another according to the different values of the wearing degrees (WD) of the physical pages.

TABLE 1

| Physical Page | Vpro_0 | Vpro_1 | Vpro_2 | ... |
|---|---|---|---|---|
| WD < 500 | 16 V | 16.6 V | 17.2 V | ... |
| 500 <= WD < 1000 | 14 V | 14.6 V | 15.2 V | ... |
| 1000 <= WD | 12 V | 12.3 V | 13.2 V | ... |

In the previous embodiments, two threshold values are applied to distinguish the wearing degrees of the physical pages, and the initial writing biases corresponding to the physical pages with different values of wearing degrees are set as the first writing bias, the second writing bias, and the third writing bias; however, the present invention is not limited thereto. In another exemplary embodiment of the present invention, the wearing degrees of the physical pages may be further classified, and the writing bias of each physical page may be calculated by the following equation:

$$Vpgm(i,n) = IVpgm - i \times A + (n) \times C$$

Here, i represents the wearing degree of the physical page, n refers to the number of the repetitive writing operations, IVpgm represents the predetermined initial writing bias, A denotes a predetermined compensation value, and C refers to the ISPP adjustment value. Vpgm(0, 0) denotes the initial writing bias when the wearing degree of the physical page is the most insignificant degree (e.g., WD<500), Vpgm(0, 1) represents the first repetitive writing bias when the wearing degree of the physical page is the most insignificant degree (e.g., WD<500), and so forth. In another exemplary embodiment, the predetermined compensation value may be changed corresponding to variations in the wearing degree, and the changes to the predetermined compensation value may refer to the linear or non-linear increase/decrease in the predetermined compensation value.

Figure 17:
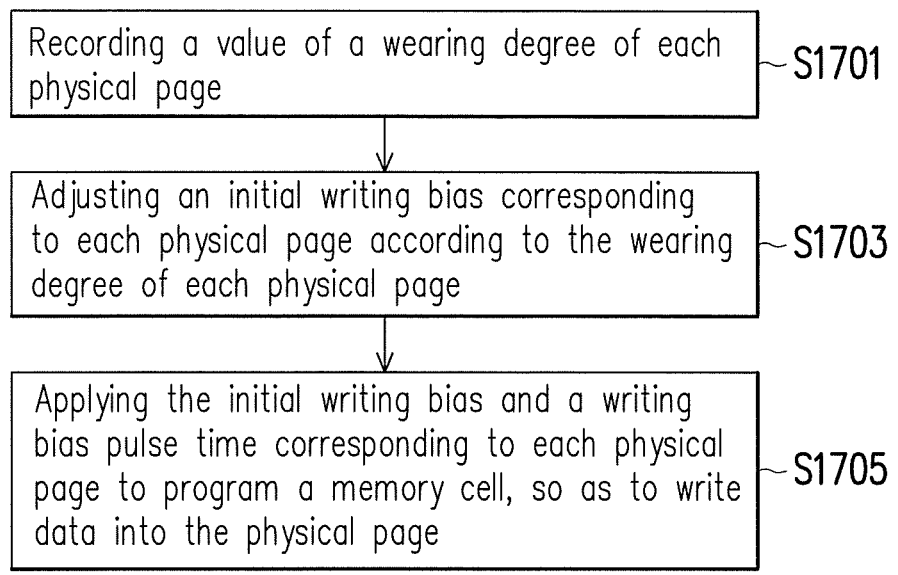
FIG. 17 is a flow chart illustrating a memory management method according to a second exemplary embodiment of the present invention.

FIG. 17 is a flow chart illustrating a memory management method according to the second exemplary embodiment of the present invention.

With reference to FIG. 17, in step S1701, the value of the wearing degree of each of the physical pages is recorded.

In step S1703, the initial writing bias corresponding to each physical page is adjusted according to the wearing degree of each physical page.

In step S1705, the initial writing bias and a writing bias pulse time corresponding to each physical page are applied to program the memory cell, so as to write data into the physical page.

Third Exemplary Embodiment

The structure of the memory storage apparatus described in the third exemplary embodiment is similar to that of the memory storage apparatus described in the first exemplary embodiment, while the difference therebetween lies in that the memory controller (or the memory management circuit) described in the third exemplary embodiment adjusts the writing bias pulse time applied in the process of programming the physical page according to the value of the wearing degree of the physical page. The reference numbers and characters used in the first exemplary embodiment are further utilized hereinafter to elaborate the difference between the first and third exemplary embodiments.

In most cases, the memory controller 104 (or the memory management circuit 202) applies a predetermined time (e.g., 16 μs) as the writing bias pulse time corresponding to the physical page of the rewritable non-volatile memory module 106. Additionally, in the process of programming the physical page, the memory controller 104 (or the memory management circuit 202) injects electrons into a memory cell by applying the writing bias pulse time together with the initial writing bias. In the present exemplary embodiment, the memory controller 104 (or the memory management circuit 202) reduces the writing bias pulse time corresponding to the physical page along with an increase in the value of the wearing degree of the physical page.

Figure 18:
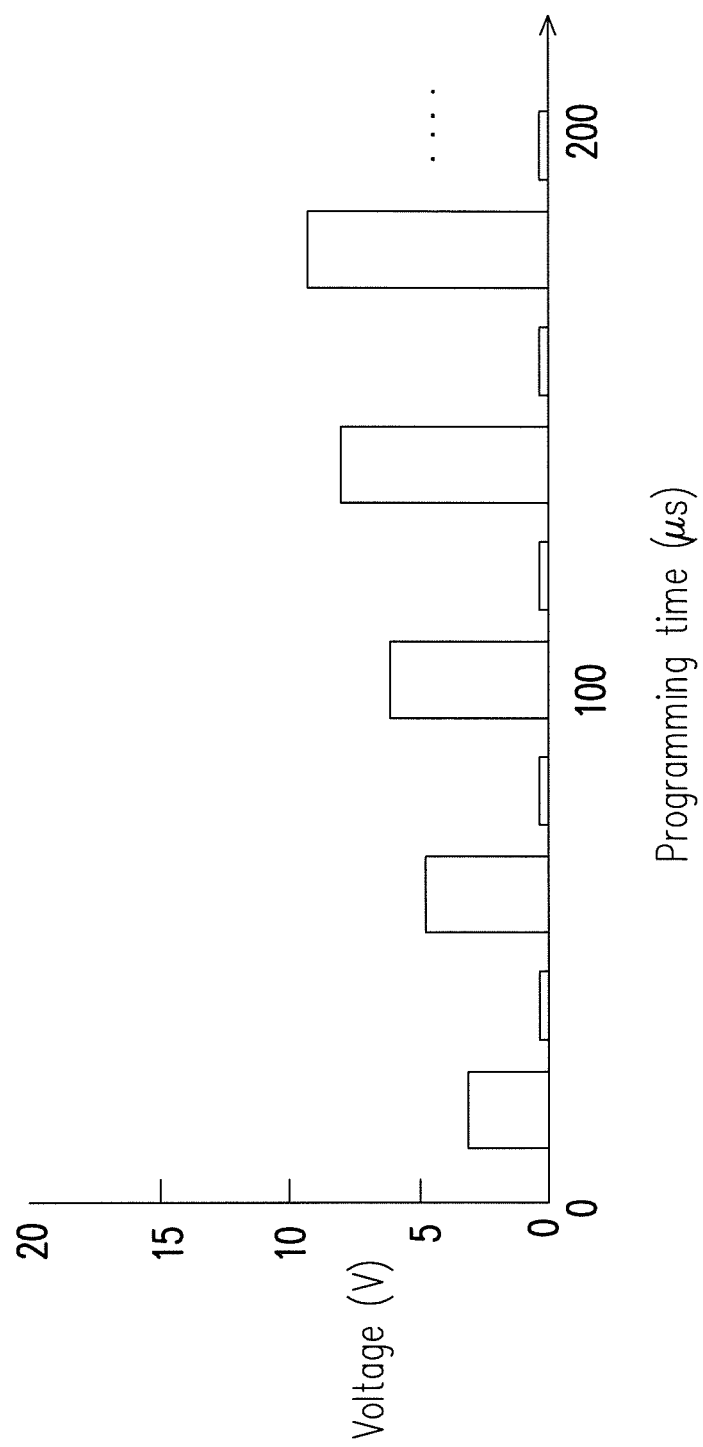
FIG. 18 to FIG. 20 are schematic diagrams of programming a memory cell according to a third exemplary embodiment of the present invention.
Figure 19:
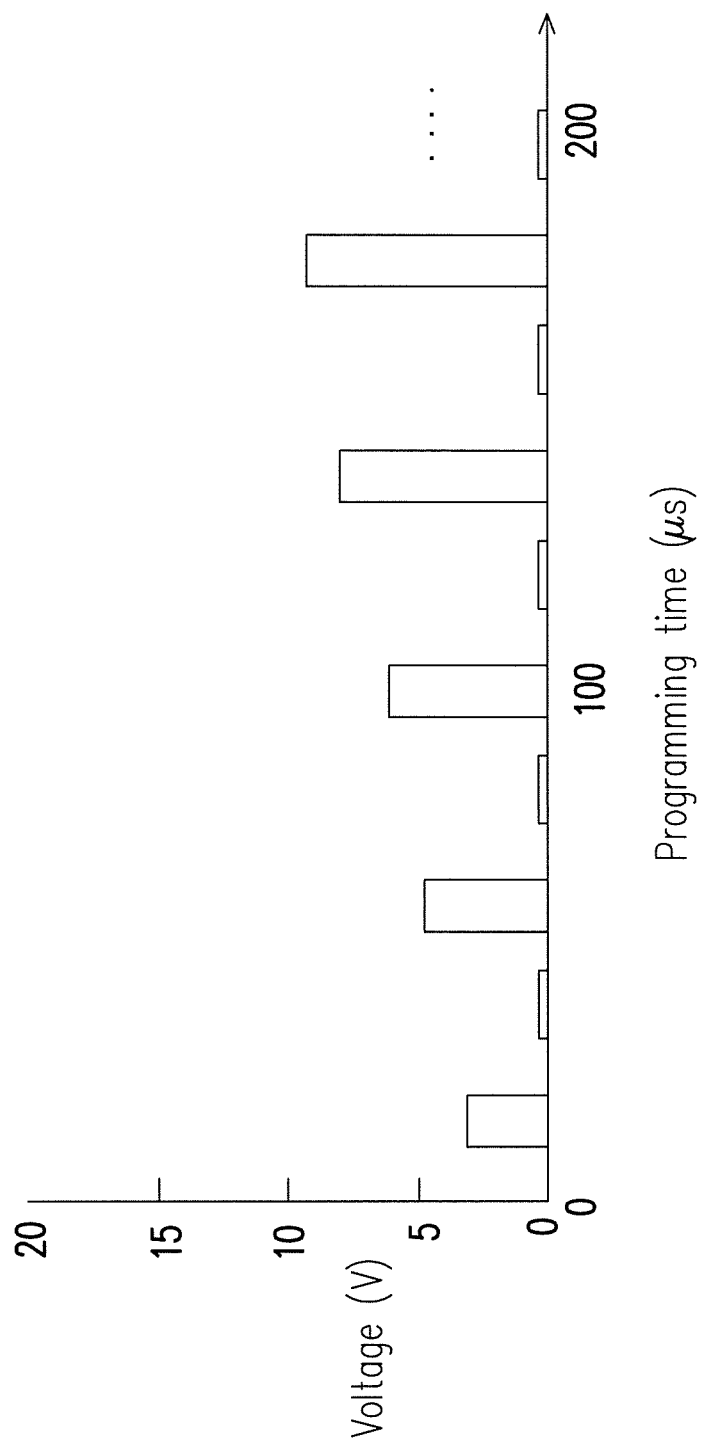
Figure 20:
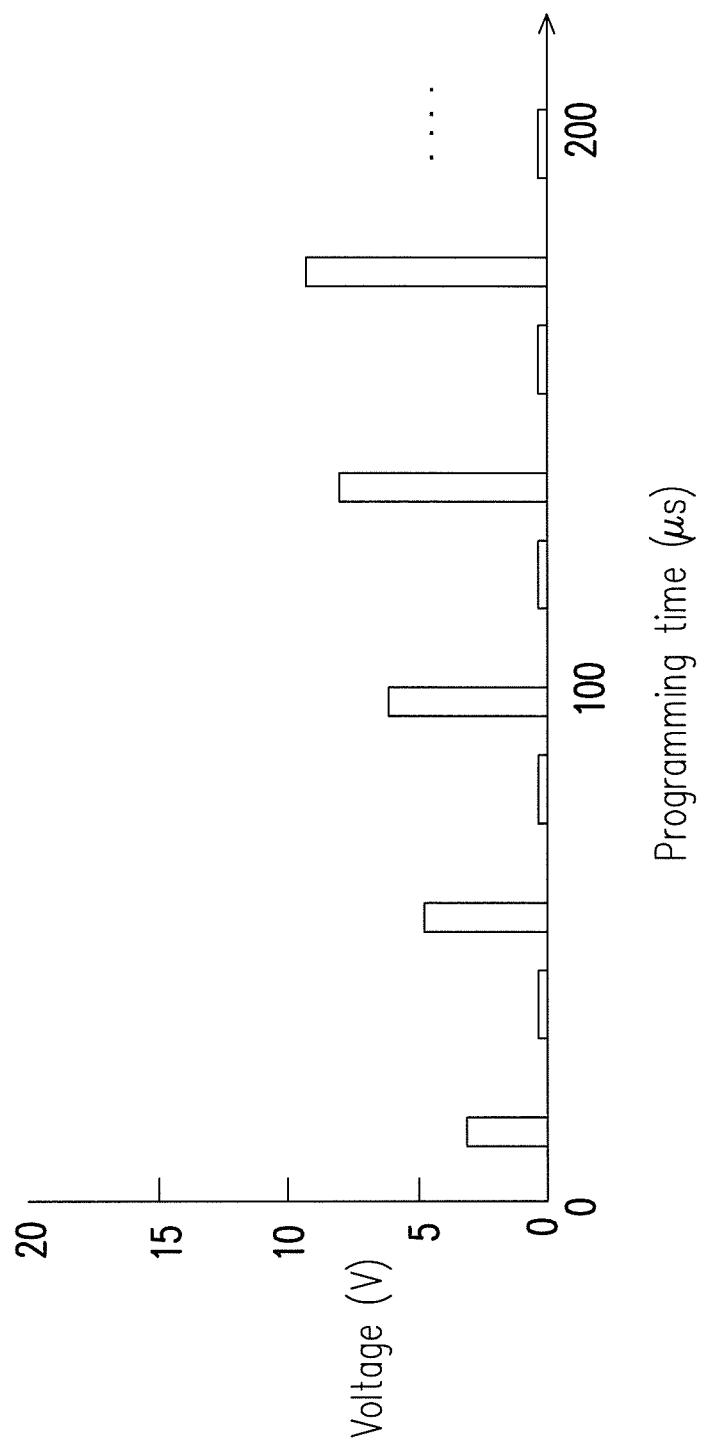

FIG. 18 to FIG. 20 are schematic diagrams of programming a memory cell according to the third exemplary embodiment of the present invention.

With reference to FIG. 18 to FIG. 19, for instance, when a memory cell is to be programmed, the memory controller 104 (or the memory management circuit 202) determines whether the value of the wearing degree of the physical page where the memory cell belongs is less than a first threshold value. If the value of the wearing degree of the physical page where the memory cell belongs is less than the first threshold value, the memory controller 104 (or the memory management circuit 202) uses a first time as the writing bias pulse time, as shown in FIG. 18. If the value of the wearing degree of the physical page where the memory cell belongs is greater than or equal to the first threshold value, the memory controller 104 (or the memory management circuit 202) determines whether the value of the wearing degree of the physical page where the memory cell belongs is less than a second threshold value. If the value of the wearing degree of the physical page where the memory cell belongs is less than the second threshold value, the memory controller 104 (or the memory management circuit 202) uses a second time as the writing bias pulse time, as shown in FIG. 19. If the value of the wearing degree of the physical page where the memory cell belongs is greater than or equal to the second threshold value, the memory controller 104 (or the memory management circuit 202) uses a third time as the writing bias pulse time, as shown in FIG. 20. Here, the first time is 18 μs, the second time is 14.4 μs, and the third time is 11.7 μs. That is, as shown in table 2, when the memory controller 104 (or the memory management circuit 202) described in the present embodiment programs the memory cell through applying a pulse writing method or a threshold voltage verification method, the writing bias pulse time utilized herein may differ according to the different values of the wearing degrees (WD) of the physical pages.

TABLE 2

| Physical Page | Writing Bias Pulse Time |
|---|---|
| WD < 500 | 18 μs |
| 500 <= WD < 1000 | 14.4 μs |
| 1000 <= WD | 11.7 μs |

Figure 21:
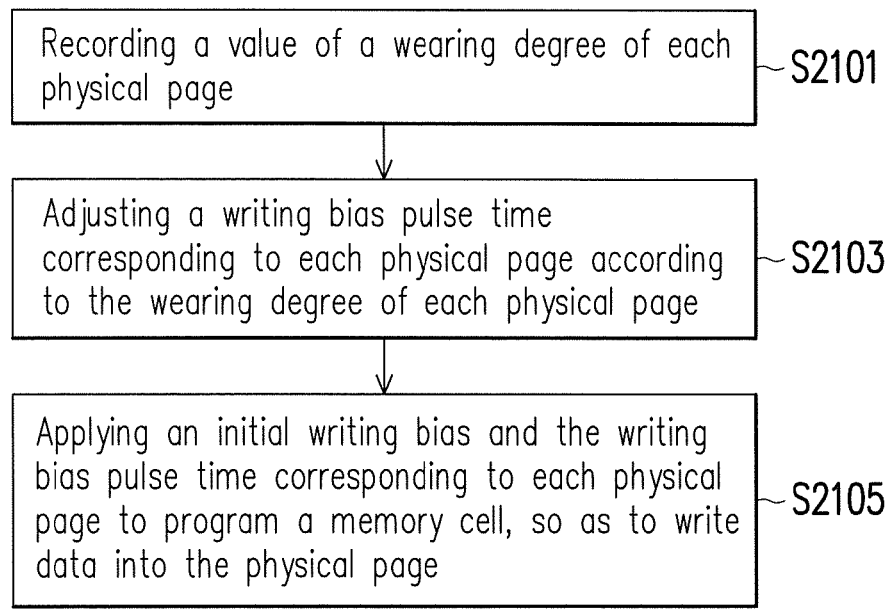
FIG. 21 is a flow chart illustrating a memory management method according to the third exemplary embodiment of the present invention.

FIG. 21 is a flow chart illustrating a memory management method according to the third exemplary embodiment of the present invention.

With reference to FIG. 21, in step S2101, the value of the wearing degree of each of the physical pages is recorded.

In step S2103, the writing bias pulse time corresponding to each physical page is adjusted according to the wearing degree of each physical page.

In step S2105, the initial writing bias and the writing bias pulse time corresponding to each physical page are applied to program the memory cell, so as to write data into the physical page.

Fourth Exemplary Embodiment

The structure of the memory storage apparatus described in the fourth exemplary embodiment is similar to that of the memory storage apparatus described in the first exemplary embodiment, while the difference therebetween lies in that the memory controller (or the memory management circuit) described in the fourth exemplary embodiment adjusts both the writing bias pulse time and the initial writing bias applied in the process of programming the physical page according to the value of the wearing degree of the physical page. The reference numbers and characters used in the first exemplary embodiment are further utilized hereinafter to elaborate the difference between the first and fourth exemplary embodiments.

According to the value of the wearing degree of each physical page, the memory controller 104 (or the memory management circuit 202) described herein simultaneously adjusts both the initial writing bias and the writing bias pulse time applied in the process of programming the physical page, so as to adjust the quantity of injected electrons in the memory cell. Thereby, error bits caused by over-writing may be prevented.

Figure 22:
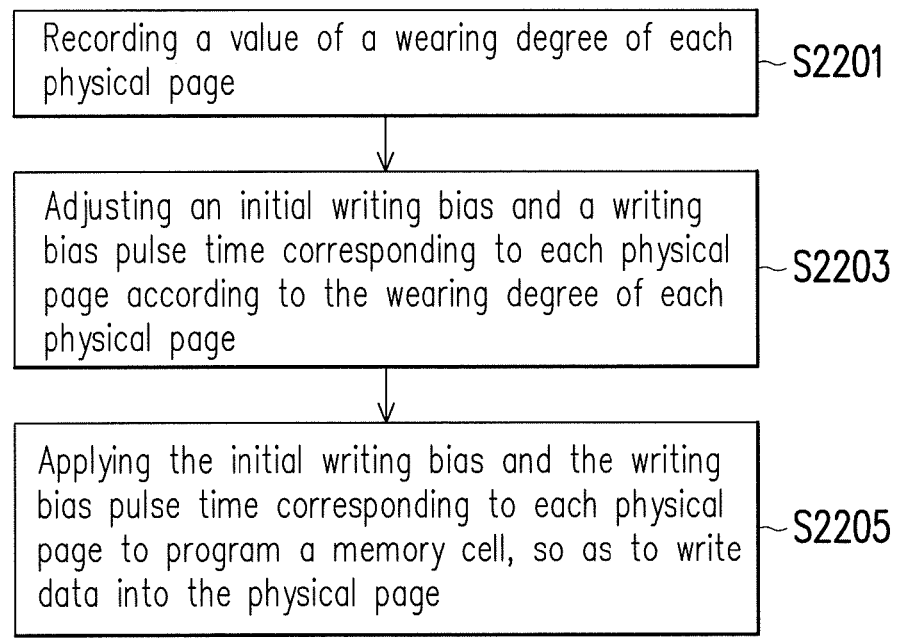
FIG. 22 is a flow chart illustrating a memory management method according to a fourth exemplary embodiment of the present invention.

For instance, when the value of the wearing degree of the physical page is larger than or equal to the first threshold value but smaller than the second threshold value, the initial writing bias is adjusted to be 90% of the default initial writing bias, and the writing bias pulse time is adjusted to be 90% of the default writing bias pulse time; when the value of the wearing degree of the physical page is larger than or equal to the second threshold value but smaller than the third threshold value, the initial writing bias is adjusted to be 85% of the default initial writing bias, and the writing bias pulse time is adjusted to be 80% of the default writing bias pulse time; when the value of the wearing degree of the physical page is larger than or equal to the third threshold value, the initial writing bias is adjusted to be 80% of the default initial writing bias, and the writing bias pulse time is adjusted to be 70% of the default writing bias pulse time;

FIG. 22 is a flow chart illustrating a memory management method according to the fourth exemplary embodiment of the present invention.

With reference to FIG. 22, in step S2201, the value of the wearing degree of each of the physical pages is recorded.

In step S2203, the writing bias pulse time and the initial writing bias corresponding to each physical page are adjusted according to the wearing degree of each physical page.

In step S2205, the initial writing bias and the writing bias pulse time corresponding to each physical page are applied to program the memory cell, so as to write data into the physical page.

Fifth Exemplary Embodiment

The structure of the memory storage apparatus described in the fifth exemplary embodiment is similar to that of the memory storage apparatus described in the first exemplary embodiment, while the difference therebetween lies in that the memory controller (or the memory management circuit) described in the fifth exemplary embodiment adjusts the verification bias applied in the process of programming the physical page according to the value of the wearing degree of the physical page.

According to the present exemplary embodiment, the memory controller 104 (or the memory management circuit 202) adjusts the verification bias applied in the process of programming the physical page according to the value of the wearing degree of each physical page. Specifically, the memory controller 104 (or the memory management circuit 202) raises the verification bias corresponding to the physical page along with an increase in the value of the wearing degree of the physical page.

For instance, when a physical page is to be programmed, the memory controller 104 (or the memory management circuit 202) determines whether the value of the wearing degree of the physical page is less than a threshold value. If the value of the wearing degree of the physical page is less than the threshold value, the memory controller 104 (or the memory management circuit 202) uses the predetermined verification bias to verify the programmed memory cell. If the value of the wearing degree of the physical page is greater than or equal to the threshold value, the memory controller 104 (or the memory management circuit 202) adds a verification bias adjustment value to the predetermined verification bias, and the resultant verification bias serves as the new verification bias.

Figure 23:
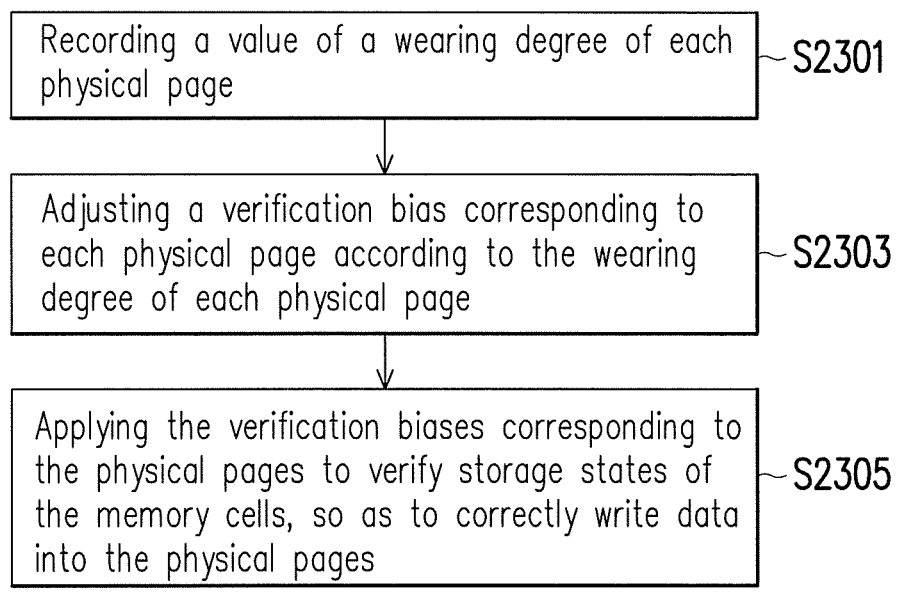
FIG. 23 is a flow chart illustrating a memory management method according to a fifth exemplary embodiment of the present invention.

FIG. 23 is a flow chart illustrating a memory management method according to the fifth exemplary embodiment of the present invention.

With reference to FIG. 23, in step S2301, the value of the wearing degree of each of the physical pages is recorded.

In step S2303, the verification bias corresponding to each physical page is adjusted according to the wearing degree of each physical page.

In step S2305, the verification biases corresponding to the physical pages are applied to verify the storage states of the memory cells in the process of programming the memory cells, so as to correctly write data into the physical pages.

To sum up, in the memory management method, the memory controller, and the memory storage apparatus described herein, two detection biases are applied to detect the incremental number of error bits of the physical pages and thereby determine the values of the wearing degrees of the physical pages. Moreover, through the memory management method, the memory controller, and the memory storage apparatus described in an exemplary embodiment of the present invention, the rewritable non-volatile memory module may be operated according to the wearing degrees of the physical pages, thus effectively preventing data loss. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A memory management method for a rewritable non-volatile memory module having a plurality of memory cells, the memory cells constituting a plurality of physical pages, the physical pages constituting a plurality of physical blocks, each of the memory cells comprising a plurality of storage states, the storage states at least comprising a first storage state and a second storage state, the memory management method comprising:

recording a value of a wearing degree of each of the physical pages; and operating the rewritable non-volatile memory module according to the values of the wearing degrees of the physical pages, wherein the step of recording the value of the wearing degree of each of the physical pages comprises:

programming a first physical page of the physical pages to write data into the first physical page;

applying a first detection bias to the first physical page to read data from the first physical page and calculating a first error bit amount in the data read by applying the first detection bias to the first physical page;

applying a second detection bias to the first physical page to read data from the first physical page and calculating a second error bit amount in the data read by applying the second detection bias to the first physical page; and estimating the value of the wearing degree of the first physical page according to the first error bit amount and the second error bit amount, wherein the first detection bias is higher than the second detection bias, the first detection bias is lower than a verification bias corresponding to the second storage state, and the second detection bias is higher than a verification bias corresponding to the first storage state.

2. The memory management method as recited in claim 1, further comprising:

calculating a value of a wearing degree of each of the physical blocks according to the values of the wearing degrees of the physical pages.

3. The memory management method as recited in claim 2, wherein the step of operating the rewritable non-volatile memory module according to the values of the wearing degrees of the physical pages comprises:

adding the values of the wearing degrees of the physical pages together to obtain a value of a present wearing degree of the rewritable non-volatile memory module;

determining whether a difference between the value of the present wearing degree of the rewritable non-volatile memory module and a value of a previous wearing degree of the rewritable non-volatile memory module is greater than a threshold value; and if the difference between the value of the present wearing degree of the rewritable non-volatile memory module and the value of the previous wearing degree of the rewritable non-volatile memory module is greater than the threshold value, selecting a first physical block and a second physical block from the physical blocks, moving data stored in the first physical block to the second physical block, and re-mapping logical addresses previously mapped to the physical pages of the first physical block to the physical pages of the second physical block, wherein the first physical block has a smallest value of the wearing degree among the physical blocks storing data, and the second physical block has a largest value of the wearing degree among the physical blocks not storing data.

4. The memory management method as recited in claim 1, wherein the step of operating the rewritable non-volatile memory module according to the values of the wearing degrees of the physical pages comprises:

adjusting at least one of an initial writing bias and a writing bias pulse time corresponding to the first physical page according to the value of the wearing degree of the first physical page; and programming the memory cells belonging to the first physical page by applying the initial writing bias and the writing bias pulse time corresponding to the first physical page, so as to write the data into the first physical page.

5. The memory management method as recited in claim 4, wherein the step of adjusting the at least one of the initial writing bias and the writing bias pulse time corresponding to the first physical page according to the value of the wearing degree of the first physical page comprises:

lowering the initial writing bias corresponding to the first physical page along with an increase in the value of the wearing degree of the first physical page.

6. The memory management method as recited in claim 4, wherein the step of adjusting the at least one of the initial writing bias and the writing bias pulse time corresponding to the first physical page according to the value of the wearing degree of the first physical page comprises:

reducing the writing bias pulse time corresponding to the first physical page along with an increase in the value of the wearing degree of the first physical page.

7. The memory management method as recited in claim 1, wherein the step of operating the rewritable non-volatile memory module according to the values of the wearing degrees of the physical pages comprises:

raising the verification biases corresponding to the storage states of the memory cells belonging to the first physical page along with an increase in the value of the wearing degree of the first physical page.

8. A memory controller for controlling a rewritable non-volatile memory module having a plurality of memory cells, the memory cells constituting a plurality of physical pages, the physical pages constituting a plurality of physical blocks, each of the memory cells comprising a plurality of storage states, the storage states at least comprising a first storage state and a second storage state, the memory controller comprising:

a host interface configured to couple to a host system;

a memory interface configured to couple to the rewritable non-volatile memory module; and a memory management circuit coupled to the host interface and the memory interface, wherein the memory management circuit is configured to record a value of a wearing degree of each of the physical pages and operate the rewritable non-volatile memory module according to the values of the wearing degrees of the physical pages, wherein in said operation of recording the value of the wearing degree of each of the physical pages, the memory management circuit programs a first physical page of the physical pages to write data into the first physical page, applies a first detection bias to the first physical page to read data from the first physical page and calculates a first error bit amount in the data read by applying the first detection bias to the first physical page, applies a second detection bias to the first physical page to read data from the first physical page and calculates a second error bit amount in the data read by applying the second detection bias to the first physical page, and estimates the value of the wearing degree of the first physical page according to the first error bit amount and the second number of error bit, wherein the first detection bias is higher than the second detection bias, the first detection bias is lower than a verification bias corresponding to the second storage state, and the second detection bias is higher than a verification bias corresponding to the first storage state.

9. The memory controller as recited in claim 8, wherein the memory management circuit is further configured to calculate a value of a wearing degree of each of the physical blocks according to the values of the wearing degrees of the physical pages.

10. The memory controller as recited in claim 9, wherein in said operation of operating the rewritable non-volatile memory module according to the values of the wearing degrees of the physical pages, the memory management circuit adds the values of the wearing degrees of the physical pages together to obtain a value of a present wearing degree of the rewritable non-volatile memory module, wherein in said operation of operating the rewritable non-volatile memory module according to the values of the wearing degrees of the physical pages, the memory management circuit determines whether a difference between the value of the present wearing degree of the rewritable non-volatile memory module and a value of a previous wearing degree of the rewritable non-volatile memory module is greater than a threshold value, wherein in said operation of operating the rewritable non-volatile memory module according to the values of the wearing degrees of the physical pages, if the difference between the value of the present wearing degree of the rewritable non-volatile memory module and the value of the previous wearing degree of the rewritable non-volatile memory module is greater than the threshold value, the memory management circuit selects a first physical block and a second physical block from the physical blocks, moves data stored in the first physical block to the second physical block, and re-maps logical addresses previously mapped to the physical pages of the first physical block to the physical pages of the second physical block, wherein the first physical block has a smallest value of the wearing degree among the physical blocks storing data, and the second physical block has a largest value of the wearing degree among the physical blocks not storing data.

11. The memory controller as recited in claim 8, wherein in said operation of operating the rewritable non-volatile memory module according to the values of the wearing degrees of the physical pages, the memory management circuit adjusts at least one of an initial writing bias and a writing bias pulse time corresponding to the first physical page according to the value of the wearing degree of the first physical page and programs the memory cells belonging to the first physical page by applying the initial writing bias and the writing bias pulse time corresponding to the first physical page, so as to write the data into the first physical page.

12. The memory controller as recited in claim 11, wherein in said operation of adjusting the at least one of the initial writing bias and the writing bias pulse time corresponding to the first physical page according to the value of the wearing degree of the first physical page, the memory management circuit lowers the initial writing bias corresponding to the first physical page along with an increase in the value of the wearing degree of the first physical page.

13. The memory controller as recited in claim 11, wherein in said operation of adjusting the at least one of the initial writing bias and the writing bias pulse time corresponding to the first physical page according to the value of the wearing degree of the first physical page, the memory management circuit reduces the writing bias pulse time corresponding to the first physical page along with an increase in the value of the wearing degree of the first physical page.

14. The memory controller as recited in claim 8, wherein in said operation of operating the rewritable non-volatile memory module according to the values of the wearing degrees of the physical pages, the memory management circuit raises the verification biases corresponding to the storage states of the memory cells belonging to the first physical page along with an increase in the value of the wearing degree of the first physical page.

15. A memory storage apparatus comprising:
a connector configured to couple to a host system;
a rewritable non-volatile memory module having a plurality of memory cells, wherein the memory cells constitute a plurality of physical pages, the physical pages constitute a plurality of physical blocks, each of the memory cells comprises a plurality of storage states, the storage states at least comprise a first storage state and a second storage state; and
a memory controller coupled to the connector and the rewritable non-volatile memory module,
wherein the memory controller is configured to record a value of a wearing degree of each of the physical pages and operate the rewritable non-volatile memory module according to the values of the wearing degrees of the physical pages,
wherein in said operation of recording the value of the wearing degree of each of the physical pages, the memory controller programs a first physical page of the physical pages to write data into the first physical page, applies a first detection bias to the first physical page to read data from the first physical page and calculates a first error bit amount in the data read by applying the first detection bias to the first physical page, applies a second detection bias to the first physical page to read data from the first physical page and calculates a second error bit amount in the data read by applying the second detection bias to the first physical page, and estimates the value of the wearing degree of the first physical page according to the first error bit amount and the second number of error bit,
wherein the first detection bias is higher than the second detection bias, the first detection bias is lower than a verification bias corresponding to the second storage state, and the second detection bias is higher than a verification bias corresponding to the first storage state.

16. The memory storage apparatus as recited in claim 15, wherein the memory controller is further configured to calculate a value of a wearing degree of each of the physical blocks according to the values of the wearing degrees of the physical pages.

17. The memory storage apparatus as recited in claim 16, wherein in said operation of operating the rewritable non-volatile memory module according to the values of the wearing degrees of the physical pages, the memory controller adds the values of the wearing degrees of the physical pages together to obtain a value of a present wearing degree of the rewritable non-volatile memory module,
wherein in said operation of operating the rewritable non-volatile memory module according to the values of the wearing degrees of the physical pages, the memory controller determines whether a difference between the value of the present wearing degree of the rewritable non-volatile memory module and a value of a previous wearing degree of the rewritable non-volatile memory module is greater than a threshold value,
wherein in said operation of operating the rewritable non-volatile memory module according to the values of the wearing degrees of the physical pages, if the difference between the value of the present wearing degree of the rewritable non-volatile memory module and the value of the previous wearing degree of the rewritable non-volatile memory module is greater than the threshold value, the memory controller selects a first physical block and a second physical block from the physical blocks, moves data stored in the first physical block to the second physical block, and re-maps logical addresses previously mapped to the physical pages of the first physical block to the physical pages of the second physical block,
wherein the first physical block has a smallest value of the wearing degree among the physical blocks storing data, and the second physical block has a largest value of the wearing degree among the physical blocks not storing data.

18. The memory storage apparatus as recited in claim 15, wherein in said operation of operating the rewritable non-volatile memory module according to the values of the wearing degrees of the physical pages, the memory controller adjusts at least one of an initial writing bias and a writing bias pulse time corresponding to the first physical page according to the value of the wearing degree of the first physical page and programs the memory cells belonging to the first physical page by applying the initial writing bias and the writing bias pulse time corresponding to the first physical page, so as to write the data into the first physical page.

19. The memory storage apparatus as recited in claim 18, wherein in said operation of adjusting the at least one of the initial writing bias and the writing bias pulse time corresponding to the first physical page according to the value of the wearing degree of the first physical page, the memory controller lowers the initial writing bias corresponding to the first physical page along with an increase in the value of the wearing degree of the first physical page.

20. The memory storage apparatus as recited in claim 18, wherein in said operation of adjusting the at least one of the initial writing bias and the writing bias pulse time corresponding to the first physical page according to the value of the wearing degree of the first physical page, the memory controller reduces the writing bias pulse time corresponding to the first physical page along with an increase in the value of the wearing degree of the first physical page.

21. The memory storage apparatus as recited in claim 15, wherein in said operation of operating the rewritable non-volatile memory module according to the values of the wearing degrees of the physical pages, the memory controller raises the verification biases corresponding to the storage states of the memory cells belonging to the first physical page along with an increase in the value of the wearing degree of the first physical page.

* * * * *